United States Patent [19]

Abe et al.

[11] Patent Number: 4,717,964

[45] Date of Patent: Jan. 5, 1988

[54] IMAGE PROCESSING APPARATUS

[75] Inventors: Yoshinori Abe; Masahiko Matsunawa; Seiichiro Hiratsuka, all of Hachioji, Japan

[73] Assignee: Konishiroku Photo Industry Co., Tokyo, Japan

[21] Appl. No.: 929,630

[22] Filed: Nov. 10, 1986

[30] Foreign Application Priority Data

Nov. 15, 1985 [JP] Japan ................................ 60-257491
Nov. 15, 1985 [JP] Japan ................................ 60-257496
Nov. 15, 1985 [JP] Japan ................................ 60-257497

[51] Int. Cl.[4] ................................................ H04N 1/40
[52] U.S. Cl. ...................................... 358/283; 358/298
[58] Field of Search .......................... 358/283, 75, 298

[56] References Cited

U.S. PATENT DOCUMENTS 4,633,327 12/1986 Roetling .............................. 358/283
4,651,287 3/1987 Tsao .................................... 358/283

*Primary Examiner*—Howard W. Britton

*Attorney, Agent, or Firm*—Frishauf, Holtz, Goodman & Woodward

[57] ABSTRACT

The present invention is to provide an image processing apparatus having structure for forming a halftone image in such manner that, on a multicoded image consisting of regions differing in density formed by multicoding by using a prescribed threshold value matrix, a plurality of differing scanning unit areas are brought each to the multicoded image for each pixel in a successive manner so as to obtain values based on the ratios between the regions differing in density of the multicoded image within the unit areas, then density patterns are obtained from the above value by using the threshold value matrix, and then the halftone image is made by comparing the density patterns with the multicoded image within the unit areas, and the image processing apparatus further has structure for making the position of the threshold value matrix used for obtaining the multicoded image coincide with the position of the threshold value matrix used for obtaining the density pattern.

12 Claims, 29 Drawing Figures

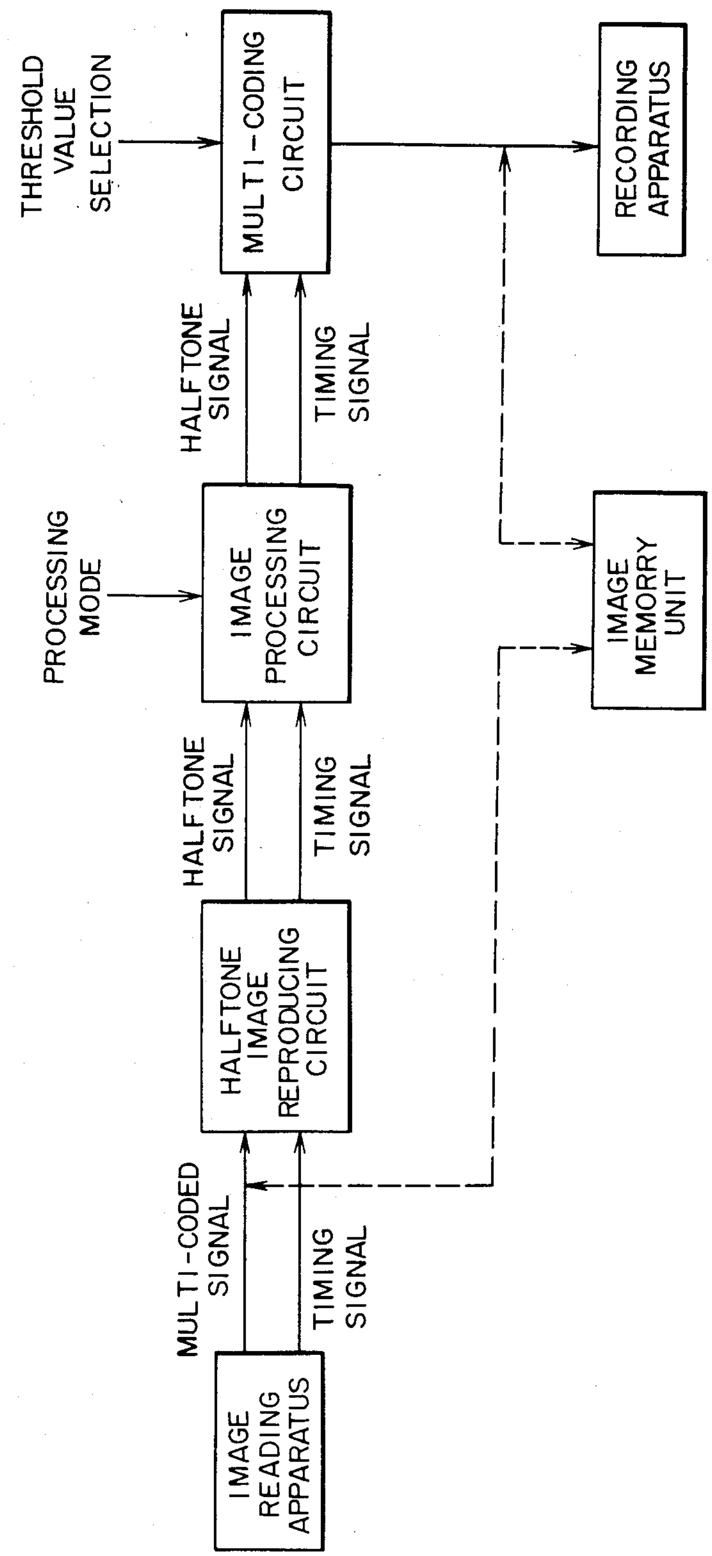
FIG. 1 1-a
IMAGE READING APPARATUS
MULTI-CODED SIGNAL
TIMING SIGNAL
HALFTONE IMAGE REPRODUCING CIRCUIT
HALFTONE SIGNAL
TIMING SIGNAL
PROCESSING MODE
IMAGE PROCESSING CIRCUIT
HALFTONE SIGNAL
TIMING SIGNAL
THRESHOLD VALUE SELECTION
MULTI-CODING CIRCUIT
RECORDING APPARATUS
IMAGE MEMORRY UNIT

| 40 | 10 | 32 | 20 | 42 | 12 | 34 | 18 | 35 | 15 | 27 | 5 | 57 | 5 | 29 | 3 |
|---|---|---|---|---|---|---|---|---|---|---|---|---|---|---|---|
| 34 | 48 | 26 | 58 | 26 | 50 | 18 | 56 | 39 | 43 | 11 | 53 | 21 | 45 | 13 | 51 |
| 29 | 15 | 37 | 5 | 27 | 13 | 35 | 7 | 24 | 20 | 52 | 10 | 22 | 3 | 30 | 1 |
| 23 | 53 | 31 | 43 | 21 | 51 | 29 | 45 | 28 | 48 | 16 | 38 | 6 | 46 | 14 | 40 |
| 41 | 11 | 33 | 17 | 39 | 9 | 31 | 19 | 36 | 16 | 28 | 2 | 54 | 2 | 46 | 4 |
| 25 | 49 | 27 | 55 | 23 | 47 | 15 | 57 | 20 | 44 | 12 | 50 | 18 | 62 | 10 | 63 |
| 28 | 14 | 36 | 8 | 30 | 16 | 38 | 6 | 23 | 19 | 51 | 13 | 45 | 1 | 53 | 0 |
| 22 | 52 | 30 | 46 | 24 | 54 | 22 | 44 | 27 | 47 | 15 | 61 | 9 | 63 | 17 | 59 |
| 43 | 7 | 35 | 17 | 45 | 9 | 37 | 15 | 25 | 15 | 40 | 40 | 60 | 25 | 63 | 3 |
| 31 | 51 | 23 | 61 | 29 | 53 | 21 | 59 | 39 | 40 | 1 | 1 | 2 | 60 | 2 | 63 |
| 36 | 12 | 44 | 2 | 34 | 10 | 42 | 4 | 24 | 63 | 63 | 63 | 63 | 5 | 60 | 1 |
| 16 | 60 | 24 | 50 | 14 | 58 | 22 | 52 | 13 | 63 | 16 | 60 | 6 | 62 | 11 | 61 |
| 49 | 9 | 41 | 41 | 50 | 40 | 40 | 10 | 61 | 52 | 48 | 2 | 58 | 2 | 54 | 3 |
| 10 | 60 | 10 | 63 | 10 | 60 | 5 | 63 | 11 | 61 | 11 | 63 | 12 | 62 | 3 | 63 |
| 40 | 1 | 60 | 60 | 60 | 1 | 50 | 0 | 40 | 2 | 60 | 1 | 40 | 5 | 61 | 61 |
| 12 | 62 | 20 | 56 | 14 | 63 | 22 | 63 | 8 | 60 | 10 | 63 | 4 | 4 | 4 | 58 |

1-c

| 45 | 5 | 37 | 15 | 57 | 7 | 39 | 13 |
|---|---|---|---|---|---|---|---|
| 29 | 53 | 21 | 63 | 31 | 55 | 23 | 61 |
| 34 | 10 | 42 | 0 | 32 | 8 | 40 | 2 |
| 18 | 58 | 25 | 46 | 16 | 56 | 24 | 50 |
| 46 | 6 | 38 | 2 | 44 | 4 | 36 | 14 |
| 38 | 54 | 22 | 50 | 28 | 52 | 20 | 52 |
| 33 | 9 | 41 | 3 | 35 | 11 | 43 | 1 |
| 17 | 57 | 25 | 51 | 19 | 59 | 27 | 49 |

1-d

| 45 | 5 | 37 | 15 | 47 | 7 | 39 | 13 | 45 | 5 | 37 | 15 | 47 | 7 | 39 | 13 |
|---|---|---|---|---|---|---|---|---|---|---|---|---|---|---|---|
| 29 | 53 | 21 | 63 | 31 | 55 | 23 | 61 | 29 | 53 | 21 | 63 | 31 | 55 | 23 | 61 |
| 34 | 10 | 42 | 0 | 32 | 8 | 40 | 2 | 34 | 10 | 42 | 0 | 32 | 8 | 40 | 2 |
| 18 | 58 | 26 | 48 | 16 | 56 | 24 | 50 | 18 | 58 | 26 | 48 | 16 | 56 | 24 | 50 |
| 46 | 6 | 38 | 12 | 44 | 4 | 36 | 14 | 46 | 6 | 38 | 12 | 44 | 4 | 36 | 14 |
| 30 | 54 | 22 | 60 | 28 | 52 | 20 | 62 | 30 | 54 | 22 | 60 | 28 | 52 | 20 | 62 |
| 33 | 9 | 41 | 3 | 35 | 11 | 43 | 1 | 33 | 9 | 41 | 3 | 35 | 11 | 43 | 1 |
| 17 | 57 | 25 | 51 | 19 | 59 | 27 | 49 | 17 | 57 | 25 | 51 | 19 | 59 | 27 | 49 |
| 45 | 5 | 37 | 15 | 47 | 7 | 39 | 13 | 45 | 5 | 37 | 15 | 47 | 7 | 39 | 13 |
| 29 | 53 | 21 | 63 | 31 | 55 | 23 | 61 | 29 | 53 | 21 | 63 | 31 | 55 | 23 | 61 |
| 34 | 10 | 42 | 0 | 32 | 8 | 40 | 2 | 34 | 10 | 42 | 0 | 32 | 8 | 40 | 2 |
| 18 | 58 | 26 | 48 | 16 | 56 | 24 | 50 | 18 | 58 | 26 | 48 | 16 | 56 | 24 | 50 |
| 46 | 6 | 38 | 32 | 44 | 4 | 36 | 14 | 46 | 6 | 38 | 12 | 44 | 4 | 36 | 14 |
| 30 | 54 | 22 | 60 | 28 | 52 | 20 | 62 | 30 | 54 | 22 | 60 | 28 | 52 | 20 | 62 |
| 33 | 9 | 41 | 3 | 35 | 11 | 43 | 1 | 33 | 9 | 41 | 3 | 35 | 11 | 43 | 1 |
| 17 | 57 | 25 | 51 | 19 | 59 | 27 | 49 | 17 | 57 | 25 | 51 | 19 | 59 | 27 | 49 |

1-e 3-a
A
GAIN 16
3-b
B
GAIN 8
3-c
C
GAIN 8
3-d
D
GAIN 4
3-e
E
GAIN 2
3-f
F
GAIN 2
3-g
G
GAIN 1

PROCESS (1) UNIT AREA G
PROCESS (2) UNIT AREA F
5-a
5-b
5-c
5-d
5-e
5-f
5-g
5-h
NO COINCIDENCE
COINCIDENCE
SELECTED UNIT AREA F
ESTIMATED VALUE 28

HALFTONE IMAGE REPRODUCING CIRCUIT
FROM IMAGE READING APPARATUS
BINARY DATA
TIMING SIGNAL
SYNCHRONIZING CLOCK
H-VALID
V-VALID
H-SYNC
SELECTING CIRCUIT #1
LINE MEMORY PART
L1
L2
L3
L4
L5
L6
L7
L8
L9
ADDRESS
SELECTING CIRCUIT #2
HALFTONE ESTIMATING PART
16a
8b
8c
4d
2e
2i
1g
SELECTING CIRCUIT
TIMING GENERATING CIRCUIT
HALFTONE SIGNAL
TIMING SIGNAL
TO IMAGE PROCESSING CIRCUIT 3
2
4
6
7
20
21
22
23
25

7-a H-SYNC
7-b H-VALID
7-c SYNCHRONIZING CLOCK
7-d IMAGE INFORMATION
ONE LINE SCANNING TIME PERIOD
IMAGE DATA EFFECTIVE PERIOD 8-a START SIGNAL FOR ORIGINAL READING
8-b H-SYNC
8-c V-VALID
READING WIDTH OF ORIGINAL

COUNTED VALUE OF WHITE PIXELS
POSITION INFORMATION
DENSITY PATTERN ROM
37-1
(64)
(64)
JUDGING CIRCUIT
38-1
JUDGING RESULT
30
SHIFT REGISTER
BINARY DATA
LA1
LA2
LA3
LA4
LA5
LA6
LA7
LA8
LA9
8
COUNTER
31
ADDER
35
SUBTRACTER
34
LATCH
33
7
g
COUNTED VALUE OF WHITE PIXELS
UNIT AREA G
COUNTER
32
8
MULTIPLIER
36
x1
Ig
TO SELECTING CIRCUIT 24
ESTIMATED VALUE

COUNTED VALUE OF WHITE PIXELS
POSITION INFORMATION
DENSITY PATTERN ROM
37-1
(32)
(32)
JUDGING CIRCUIT
38-1
JUDGING RESULT
30
SHIFT REGISTER
BINARY DATA
8
COUNTER
ADDER
LATCH
SUBTRACTER
COUNTER
8
6
f
COUNTED VALUE OF WHITE PIXELS
UNIT AREA F
MULTIPLIER
x2
2f
TO SELECTING CIRCUIT 24
ESTIMATED VALUE

COUNTED VALUE OF WHITE PIXELS
POSITION INFORMATION
DENSITY PATTERN ROM
37-3
(32)
(32)
JUDGING CIRCUIT
38-3
JUDGING RESULT
30
SHIFT REGISTER
BINARY DATA
4
COUNTER
ADDER
SUBTRACTER
LATCH
6
e
COUNTED VALUE OF WHITE PIXELS
UNIT AREA E
COUNTER
4
MULTIPLIER
x2
2e
TO SELECTING CIRCUIT 24
ESTIMATED VALUE

COUNTED VALUE OF WHITE PIXELS
POSITION INFORMATION
DENSITY PATTERN ROM
37-4
(16)
(16)
JUDGING CIRCUIT
38-4
JUDGING RESULT
30
SHIFT REGISTER
BINARY DATA
4
COUNTER
ADDER
SUBTRACTER
LATCH
5
d
COUNTER
4
MULTIPLIER
x4
4d
TO SELECTING CIRCUIT 24
ESTIMATED VALUE
COUNTED VALUE OF WHITE PIXELS
UNIT AREA D

COUNTED VALUE OF WHITE PIXELS
POSITION INFORMATION
BINARY DATA
30
SHIFT REGISTER
DENSITY PATTERN ROM
37-5
(8)
(8)
JUDGING CIRCUIT
38-5
JUDGING RESULT
4
COUNTER
ADDER
SUBTRACTER
LATCH
4
c
COUNTED VALUE OF WHITE PIXELS
UNIT AREA C
COUNTER
4
MULTIPLIER
x8
8c
TO SELECTING CIRCUIT 24
ESTIMATED VALUE

COUNTED VALUE OF WHITE PIXELS
POSITION INFORMATION
BINARY DATA
30
SHIFT REGISTER
DENSITY PATTERN ROM
37-6
(8)
(8)
JUDGING CIRCUIT
38-6
JUDGING RESULT
COUNTER
2
ADDER
SUBTRACTER
LATCH
4
b
COUNTED VALUE OF WHITE PIXELS
UNIT AREA B
COUNTER
2
MULTIPLIER
x8
8b
TO SELECTING CIRCUIT 24
ESTIMATED VALUE

COUNTED VALUE OF WHITE PIXELS
POSITION INFORMATION
BINARY DATA
30
SHIFT REGISTER
DENSITY PATTERN ROM
37-7
(4)
(4)
JUDGING CIRCUIT
38-7
JUDGING RESULT
2
COUNTER
ADDER
SUBTRACTER
LATCH
3
a
COUNTED VALUE OF WHITE PIXELS
UNIT AREA A
COUNTER
2
MULTIPLIER
x16
16a
TO SELECTING CIRCUIT 24
ESTIMATED VALUE 17-d

| | ADDRESS | DATA | |
|---|---|---|---|
| WHITE PIXEL 0 | 0 | 0 0 | INITIAL POSITION |
| | ⟆ | ⟆ | |
| | 7 | 0 0 | |
| WHITE PIXEL 1 | 8 | 1 0 | INITIAL POSITION |
| | 9 | 2 0 | |
| | A | 4 0 | |
| | B | 8 0 | |
| | C | 0 1 | |
| | D | 0 2 | |
| | E | 0 4 | |
| | F | 0 8 | |

FIG. 17-a

MOVING CENTER OF UNIT AREA

| 45 | 5 | 37 | 15 | 47 | 7 | 39 | 13 | 45 | 5 | 37 | 15 | 47 | 7 | 39 | 13 |
|---|---|---|---|---|---|---|---|---|---|---|---|---|---|---|---|
| 29 | 53 | 21 | 63 | 31 | 55 | 23 | 61 | 29 | 53 | 21 | 63 | 31 | 55 | 23 | 61 |
| 34 | 10 | 42 | 0 | 32 | 8 | 40 | 2 | 34 | 10 | 42 | 0 | 32 | 8 | 40 | 2 |
| 18 | 58 | 26 | 48 | 16 | 56 | 24 | 50 | 18 | 58 | 26 | 48 | 16 | 56 | 24 | 50 |
| 46 | 6 | 38 | 32 | 44 | 4 | 36 | 14 | 46 | 6 | 38 | 12 | 44 | 4 | 36 | 14 |
| 38 | 54 | 22 | 60 | 28 | 52 | 20 | 62 | 30 | 54 | 22 | 60 | 26 | 52 | 20 | 62 |
| 33 | 9 | 41 | 3 | 35 | 11 | 43 | 1 | 33 | 9 | 41 | 3 | 35 | 11 | 43 | 1 |
| 17 | 57 | 25 | 51 | 19 | 59 | 27 | 49 | 17 | 57 | 25 | 51 | 19 | 59 | 27 | 49 |
| 45 | 5 | 37 | 15 | 47 | 7 | 39 | 13 | 45 | 5 | 37 | 15 | 47 | 7 | 39 | 13 |
| 29 | 53 | 21 | 63 | 31 | 55 | 23 | 61 | 29 | 53 | 21 | 63 | 31 | 55 | 23 | 61 |
| 34 | 10 | 42 | 0 | 32 | 8 | 40 | 2 | 34 | 10 | 42 | 0 | 32 | 8 | 40 | 2 |
| 18 | 58 | 26 | 48 | 16 | 56 | 24 | 50 | 18 | 58 | 26 | 48 | 16 | 56 | 24 | 50 |
| 46 | 6 | 38 | 12 | 44 | 4 | 36 | 14 | 46 | 6 | 38 | 12 | 44 | 4 | 36 | 14 |
| 30 | 54 | 22 | 60 | 28 | 52 | 20 | 62 | 30 | 54 | 22 | 60 | 28 | 52 | 20 | 62 |
| 33 | 9 | 41 | 3 | 35 | 11 | 43 | 1 | 33 | 9 | 41 | 3 | 35 | 11 | 43 | 1 |
| 17 | 57 | 25 | 51 | 19 | 59 | 27 | 49 | 17 | 57 | 25 | 51 | 19 | 59 | 27 | 49 |

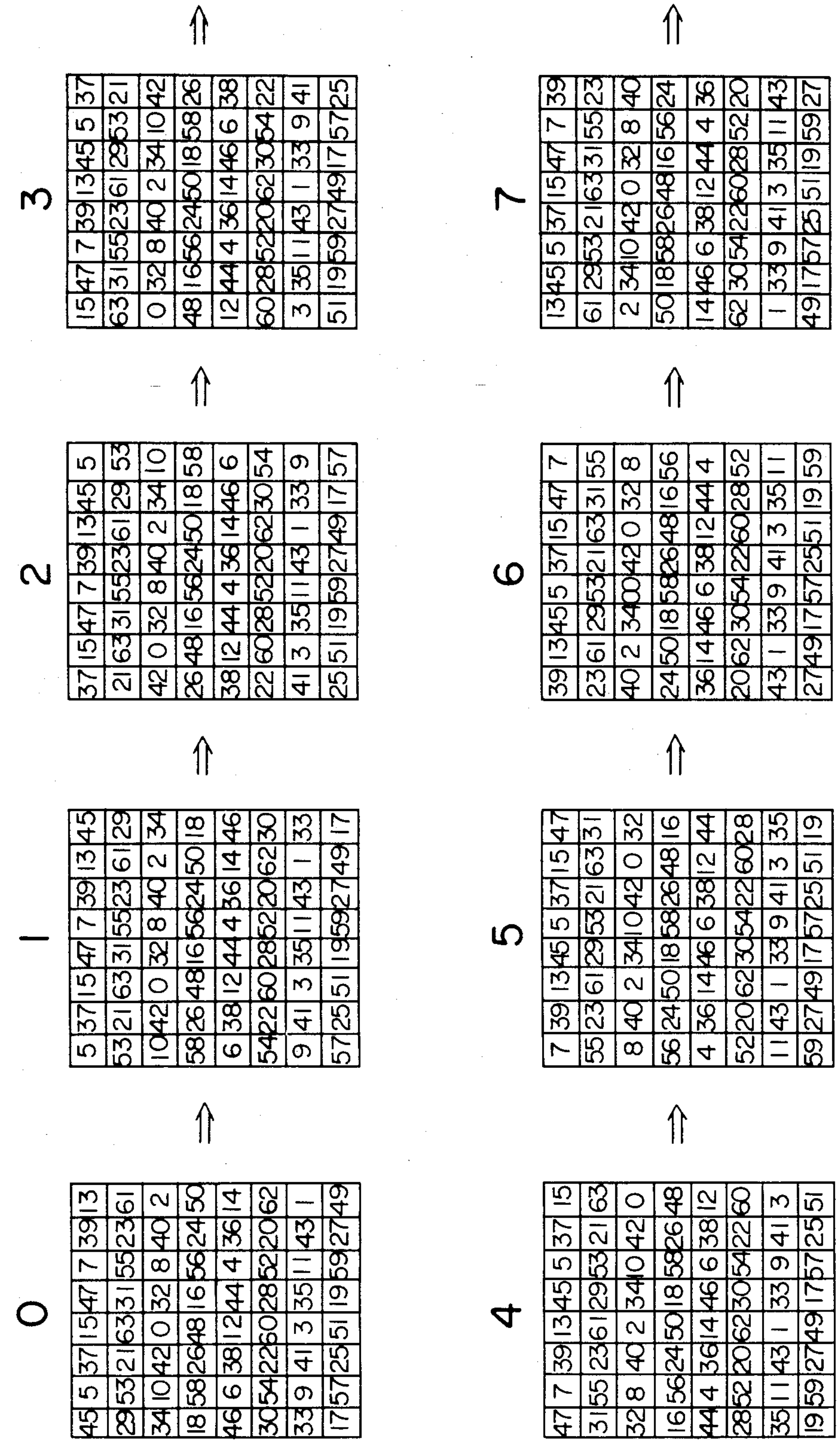
FIG. 17-b

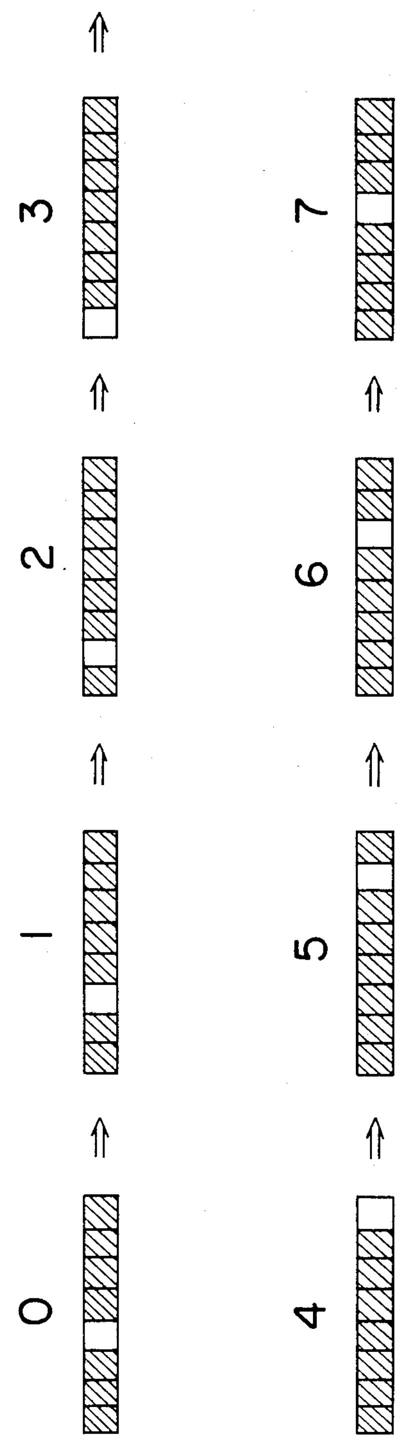
FIG. 17-c

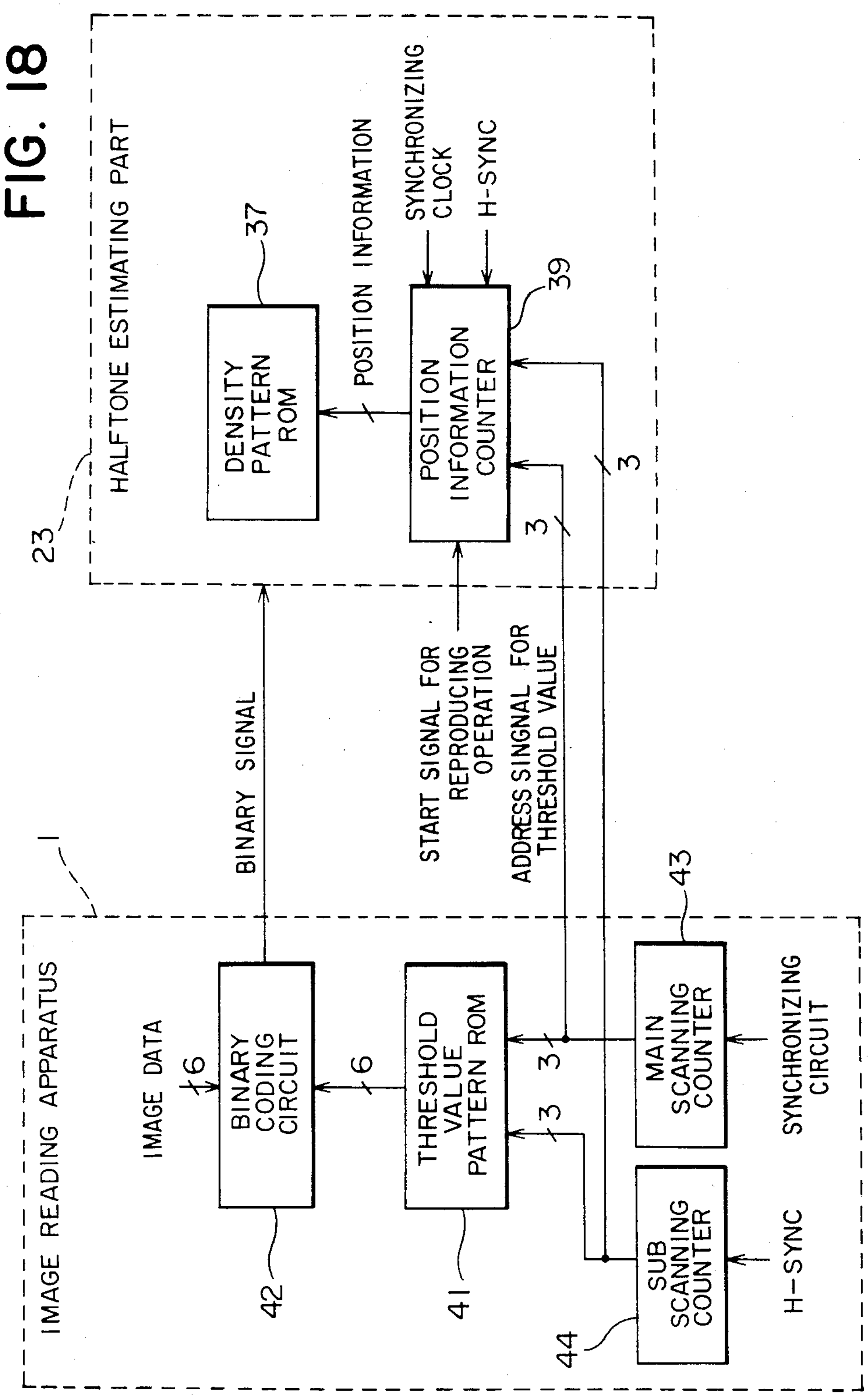
FIG. 18
23
HALFTONE ESTIMATING PART
DENSITY PATTERN ROM
37
POSITION INFORMATION
SYNCHRONIZING CLOCK
H-SYNC
POSITION INFORMATION COUNTER
39
3
3
START SIGNAL FOR REPRODUCING OPERATION
ADDRESS SINGNAL FOR THRESHOLD VALUE
BINARY SIGNAL
1
IMAGE READING APPARATUS
IMAGE DATA
6
BINARY CODING CIRCUIT
42
6
THRESHOLD VALUE PATTERN ROM
41
3
3
MAIN SCANNING COUNTER
43
SYNCHRONIZING CIRCUIT
SUB SCANNING COUNTER
44
H-SYNC

FIG. 20

| ADDRESS | DATA |
|---|---|
| 0 | 45 |
| 1 | 5 |
| 2 | 37 |
| 3 | 15 |
| 4 | 47 |
| 5 | 7 |
| 6 | 39 |
| 7 | 13 |
| 8 | 29 |
| 9 | 53 |
| A | 21 |
| B | 63 |
| C | 31 |

INITIAL VALUE 21-a ORIGINAL READING
21-b H-SYNC
21-c V-VALID
21-d SYNCHRONIZING CLOCK
21-e H-VALID
21-f ADDRESS OF THRESHOLD VALUE ROM
0
1
2
8
9
A
10
11
12
18

22-a
22-b
INPUT DATA
PIXEL
THRESHOLD VALUE MATRIX
DITHER METHOD
OUTPUT DATA
DENSITY PATTERN METHOD

IMAGE PROCESSING APPARATUS

BACKGROUND OF THE INVENTION

The present invention relates to an image processing apparatus and, more particularly, to one enabling estimation of a halftone image from a multicoded image.

Many of the outputting apparatuses, that is to say, indicators and printing apparatuses, in commercial use today are limited to reproduction only in white and black. It is known that a technique called "density pattern method" (luminance pattern method) or another called "dither method", both applicable by means of such conventional outputting apparatuses, is employed for a simulative effect in representing halftones. Both the density pattern method and the dither method are a kind of per area gradation method, consisting in changing the number of dots put in a unit area (matrix).

The density pattern method, as shown by FIG. 22-*b*, consists in recording, by using a threshold value matrix, in the part corresponding to a pixel of the original with a plurality of dots, whereas the dither method is, as shown by FIG. 22-*a*, to record with one dot in the part corresponding to a pixel of the original. Both of these methods give, as shown by the same illustrations, binary coded output data, which represent halftone images with two values "white" and "black" in a manner of simulation.

In such conversion, it is advantageous for a method to be capable of reverse conversion from halftone images simulatively represented by binary coded values to the original halftone images, i.e., input data as shown in FIG. 22, because such capability permits various modes of processing of the data and hence conversion of images in various ways. An image represented in a density pattern can be put back directly to its original halftone image if the array of the pattern levels is determined, but the resolution is low relative to the information content. Contrarily, a dither image, compared with a density pattern image, enables a high resolution relative to the information content, but it is difficult for a dither image to be put back to the original halftone image. Therefore, a dither method alone is not capable of image conversion to suit a variety of needs.

SUMMARY OF THE INVENTION

With the above-mentioned problem taken into account, the present invention has for its object to provide an apparatus for processing images, which is capable of satisfactorily estimating the original halftone images on the basis of their corresponding multicoded images, including binary coded images.

In accordance with the foregoing object, the present invention is to provide an image processing apparatus having a means for forming a halftone image in such manner that, on a multicoded image consisting of regions differing in density formed by multicoding with using a prescribed threshold value matrix, a plurality of differing scanning unit areas are brought each to the multicoded image for each pixel in a successive manner so as to obtain values based on the ratios between the regions differing in density of the multicoded image within the unit areas, then density patterns are obtained from the above value by using the threshold value matrix, and then the halftone image is made by comparing the density patterns with the multicoded image within the unit areas, and the image processing apparatus further has a means for making the position of the threshold value matrix used for obtaining the multicoded image coincide with the position of said threshold value matrix used for obtaining the density pattern.

A method embodying this invention consists in comparing multicoded images within each of a plurality of differing unit areas applied to every pixel with reconverted multicoded images obtained after processing the multicoded images in a prescribed manner and thereby selecting the optimal unit area.

BRIEF DESCRIPTION OF THE DRAWINGS

FIG. 18 diagrammatically explains traffic of signals between the image reading apparatus and the halftone estimating part.

FIG. 20 shows the contents of a threshold value ROM.

DETAILED DESCRIPTION OF THE INVENTION

Figure 1:
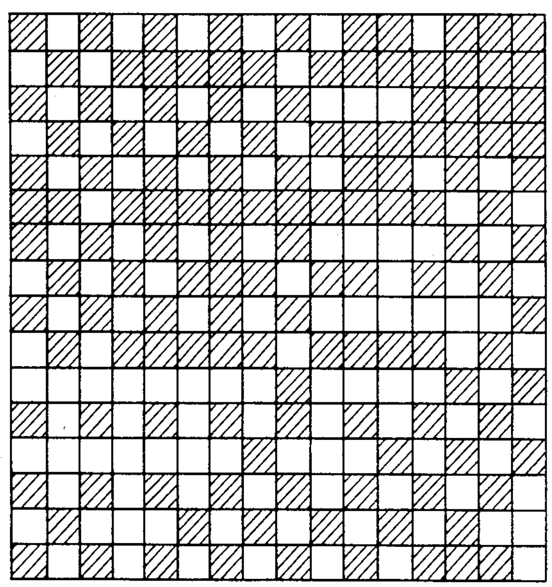
FIG. 1-*a* is a block diagram showing the configuration of an embodiment of the present invention, FIG. 1-*b* through 1-*e* are explanatory drawings showing a case where a dither image is obtained from an original halftone image.

Referring to the drawings, there is now explained an embodiment of the present invention in detail hereunder.

FIG. 1 is a block diagram showing the configuration of an embodiment of the present invention, wherein numeral 1 denotes an image reading apparatus for reading an original image and converting it to multicoded data. The image reading apparatus is designed to read an original image by means of a photoelectric converter, such as CCD, so as to convert it to electric signals; the electric signals resulting from the conversion are converted by A/D conversion to the correspondent digital data, which, after having shading compensation (levelling treatment of CCD outputs), are converted to multi-coded data. Numeral 2 denotes a halftone image reproducing circuit, which, is supplied with multicoded digital data (including binary coded data) and timing signals from the image reading apparatus 1, processes the multicoded digital data into halftone image signals.

Numeral 3 denotes an image processing circuit, which is supplied with halftone image signals and timing signals from the halftone image reproducing circuit 2 and carries out the processing of an image, such as enlargement, reduction and filtering, in accordance with the processing modes set by the host computer (not shown in drawings). Numeral 4 denotes a multicoding circuit, which is supplied with halftone signals and timing signals from the image processing circuit 3 and carries out the multicoding by using the threshold values selected by threshold value selection signals set by the host computer or keyboard. Numeral 5 denotes a recording apparatus, which receives multicoded data outputted by the multicoding circuit 4 and reproduces an image therefrom. Numeral 6 denotes an image memory unit for storing binary data outputted by the image reading apparatus 1 and/or multicoded data outputted by the multicoding circuit 4. A laser printer, LED printer, or the like is employed in the recording apparatus 5. These apparatuses are operated as follows.

An image recorded on an original is read by a photoelectric converter, such as CCD, in the image reading apparatus 1 so that it is converted to electric signals, and the image signals represented by electric signals, resulting from the conversion, are then converted to digital data by an A/D converter in the same image reading apparatus 1. The digital data resulting from said conversion are subjected to shading compensation in respect of each pixel as a unit, and then are converted to multicoded digital data, by the multicoding circuit within said same image reading apparatus 1, which are outputted. These outputted multicoded data are transmitted to the halftone image reproducing circuit 2 and simultaneously stored in the image memory unit 6. The halftone image reproducing circuit 2 reproduces the halftone image from the inputted multicoded data.

Incidentally, the multicoding manner is explained by taking the binary coding as an example as shown in FIG. 1-*b*,1-*c*, 1-*d*, and 1-*e*.

FIG. 1-*b* indicates an example of halftone image data being obtained by the step of reading an image recorded on an original by CCD (photo-electric converter), converting the read data into the digital data by the A/D converter, and then subjecting the digital data to the shading compensation.

FIG. 1-*e* indicates the binary coded data being obtained by comparing the above halftone image showed in FIG. 1-*b* with a threshold matrix as shown in FIG. 1-*c* as one example in the manner as shown in FIG. 1-*d*.

The operation of the halftone image reproducing circuit 2 is now described hereunder, starting with the method prior to the description of the apparatus.

Figure 2:
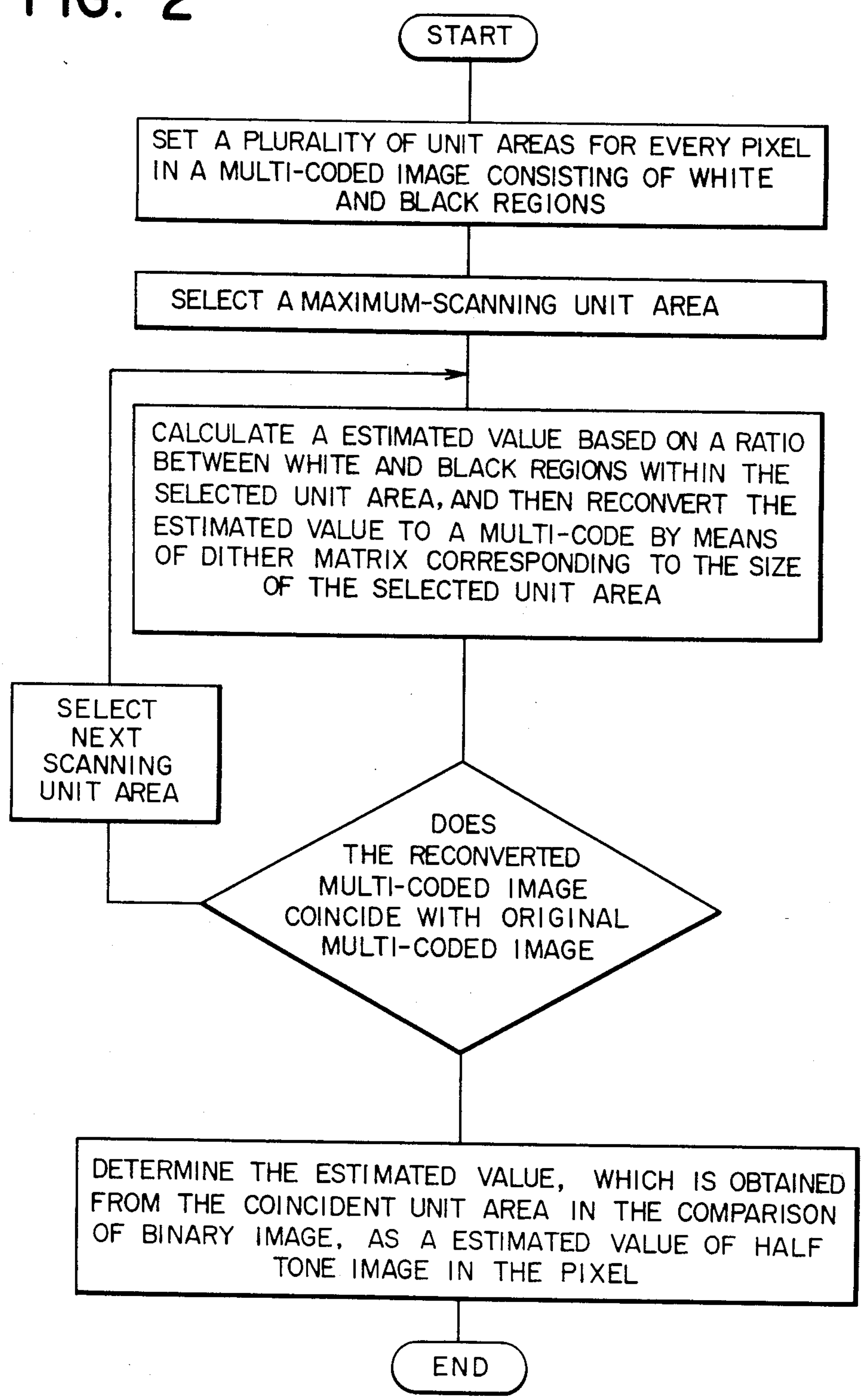
FIG. 2 is a flowchart illustrating the method of estimating a halftone image in the practice of the present invention.

FIG. 2 is a flowchart showing an example of a method embodying the present invention. Referring to this flowchart, the method is explained in sequence.

STEP 1

Set a plurality of differing unit areas each in position for scanning in respect of each pixel in a multicoded image consisting of regions differing in density.

Figure 3:
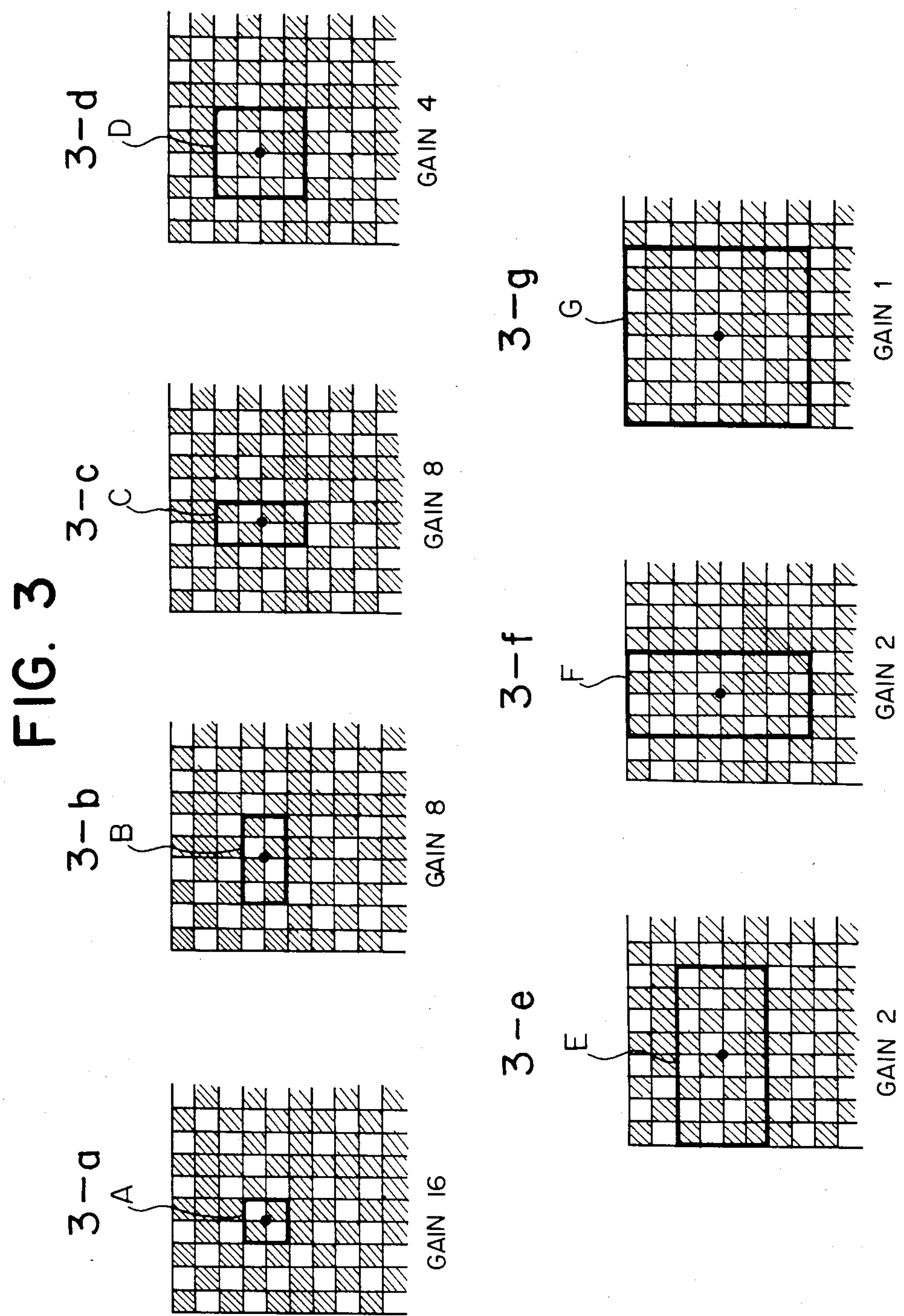
FIG. 3 shows examples of binary coded images and unit areas.

FIG. 3, comprising 3-*a* through 3-*g*, illustrates examples of multicoded images consisting of binary coded images as shown in FIG. 1-*e*, each with a unit area applied. The unit areas are shown by A (2 rows, 2 columns (2×2)) in 3-*a*, B (2 rows, 4 columns (2×4)) in 3-*b*. C (4 rows, 2 columns (4×2)) in 3-*c*, D (4 rows, 4 columns (4×4)) in 3-*d*, E (4 rows, 8 columns (4×8)) in 3-*e*, F (8 rows, 4 columns (8×4)) in 3-*f*, and G (8 rows, 8 columns (8×8)) in 3-*g*. The black thick dot in each unit area constitutes the moving center when the unit area is shifted on the binary coded image and is a point for estimating the halftone image. The description hereunder is given with reference to examples of binary coded images.

In the practice of the present invention, the optimum unit area is selected out of these plurality of differing unit areas, taking into consideration the fact that man's sense of sight has a high ability for discriminating gradations in a low spatial frequency region (a region in which changes in pixel density level are small) while this ability is low in a high spatial frequency region (a region in which changes in pixel density level are large). Therefore, halftone images of high quality are obtainable on the whole by using a large unit area for sharp gradation representation in a low spatial frequency region and by using a small unit area in a high spatial frequency region so as to reproduce images of high resolution.

STEP 2

First select the largest scanning unit area G.

Figure 4:
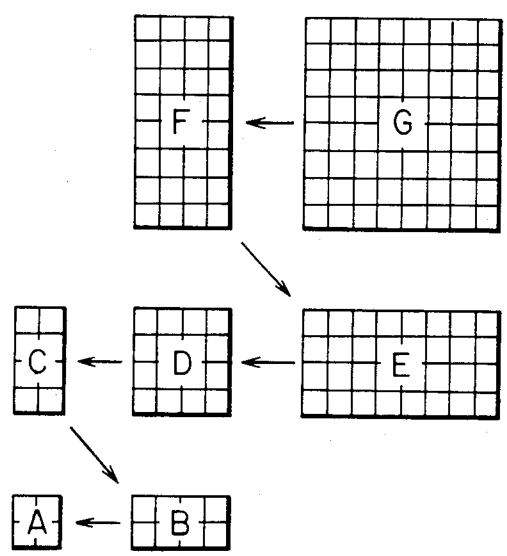
FIG. 4 shows the sequence in which a unit area is selected.

As mentioned in the description of STEP 1, it is a basic principle in practicing the present invention to select as large a unit area as possible so long as no change in density is observed in the unit area. Accordingly, as shown by FIG. 4, the unit areas are selected in the order of

G→F→E→D→C→B→A

STEP 3

Calculate an estimated value based on the ratio between the white and black regions within the selected unit area, and then reconvert the estimated value to a multicode by means of a dither matrix corresponding to the size of the selected unit area.

Figure 5:
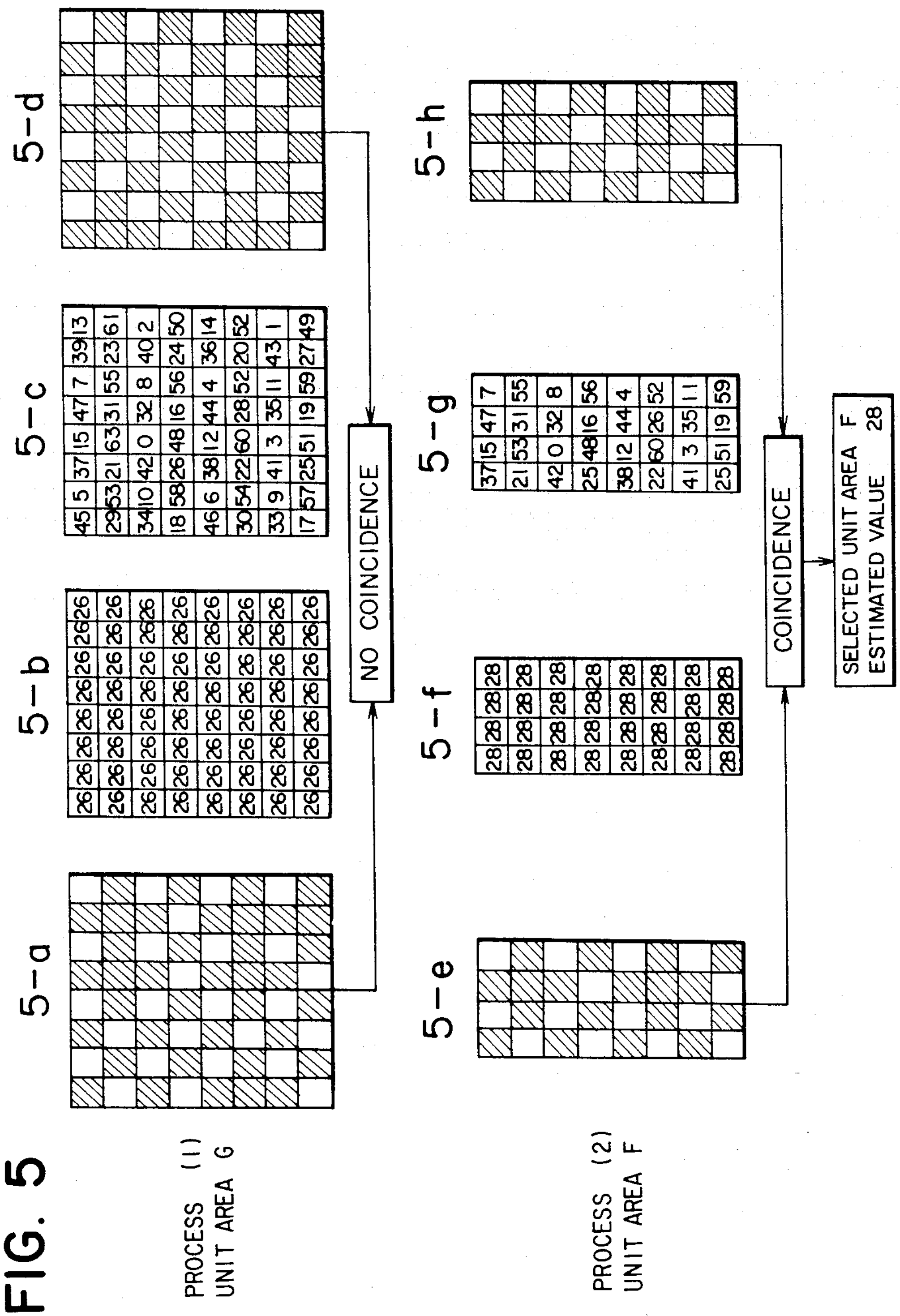
FIG. 5 illustrates the manner in which a unit area is selected.

The drawing 5-*a* in FIG. 5 represents the binary coded image within the enclosure of a unit area G which is set in position for scanning at an initial position as in 3-*g* in FIG. 3. The white pixels within the unit area number twenty-six in total. Assuming the number 26 as an estimated value to represent the average pixel level of all the pixels within the unit area, all the pixels, as shown by 5-*b* in FIG. 5, are filled in with 26*s* and thus the image 5-*b* in FIG. 5 is obtained as an estimated halftone image.

After thus obtaining an estimated halftone image, this halftone image is reconverted to a binary code by means of a dither matrix corresponding to the size of the unit area G, as shown by 5-*c* in FIG. 5. For example, the value 26 at 1st row, 1st column (1, 1) in a halftone image 5-*b* in FIG. 5, compared with the value 45 (1, 1) in a dither matrix 5-*c*, is smaller so the pixel (1, 1) is made black. The value 26 (1, 2) in 5-*b*, compared with the value 5 (1, 2) in 5-*c*, is larger so the pixel (1, 2) is made white. This binary recoding of the halftone image 5-*b* produces a binary coded image denoted by 5-*d* in FIG. 5.

STEP 4

Check and see if the reconverted multi-coded image coincides with the original multi-coded image.

In the example shown by FIG. 5, the original binary-coded image denoted by 5-*a* is compared with the reconverted binary-coded image denoted by 5-*d*. Apparently, the two do not coincide with each other. No coincidence in this instance means that there has been a change in pixel density level within the unit area G.

STEP 5

Select another scanning unit area if the unit area G is found to be inappropriate (the result is no coincidence).

The order of the selection of unit areas being as specified in FIG. 4, the unit area F is to be selected next. With the unit area F the process specified as STEP 3 is repeated. The drawing 5-*e* in FIG. 5 is a binary-coded image at the initial position enclosed within the unit area F. The white pixels within this enclosure number fourteen in total. The unit area F produces an estimated value of 28 which is said 14 multiplied by the gain 2 of the unit area F.

The word "gain" of a unit area referred to herein can be defined as the quotient obtained by dividing the area of the largest unit area by the area of said unit area referred to. For example, the gain of the unit area A is 16, which is the quotient obtained by dividing the area of the largest unit area G ($8\times8=64$) by the area of the unit area A ($2\times2=4$). Each of the unit areas in FIG. 3 is marked with a gain just under the respective drawings. The gains are used to compensate the gradation characteristic in each unit area to a uniform scale.

Assuming the number 28 as an estimated value to represent the average pixel density level of the binary-coded image denoted by 5-*e*, all the pixels, as shown by 5-*f* in FIG. 5, are filled in with 28s, and then the image 5-*f* in FIG. 5 is obtained as an estimated halftone image. After thus obtaining an estimated halftone image, this halftone image is reconverted to a binary code by using a dither matrix corresponding to the size of the unit area F, as shown by 5-*g* in FIG. 5, the reconversion consequently produces a binary-coded image denoted by 5-*h* in FIG. 5.

Then the original binary-coded image denoted by 5-*c* is compared with the reconverted binary-coded image denoted by 5-*h*. Apparently, the two coincide with each other as illustrated, the coincidence means that there has been no change in pixel level within the unit area F, hence the appropriateness of the unit area F.

STEP 6

By using as a selected unit area the unit area (F) in which the reconverted binary-coded image coincides with the original binary-coded image, determine the estimated value obtainable (28 in this instance) as an estimated value of the halftone image in the pixel at the moving center. The value 28 in the drawing 5-*f* in FIG. 5 is the estimated value thus obtained.

Now, assuming that an estimated value of the pixel (1st row, 1st column) of the halftone image is determined as 28. After above estimation operation, the moving center of unit areas are expected to move by one pixel on the binary coded image data showed in FIG. 1-*e* and FIG. 3-*g*. The moving center of the unit areas move by one column, for example, and then a newly estimated value is obtained by performing the above estimation operation. This current estimated value is corresponded to the pixel (1st row, 2nd column).

In this example, same estimation operation may be successively carried out per 1st row of the estimated halftone image, and then, after completion of the estimation operation per 1st row, the moving center of the unit areas may return to initial column and move by one row on the binary coded image data, above same operation may comencement for the pixel (2nd row, 1st column).

By thus selecting the optimal unit areas for all the pixels and repeating the estimation of halftone images on the basis of the optimal unit areas, images of good quality can be estimated for all images. Therefore, when an image is reproduced on a recording apparatus on the basis of estimated values thus obtained, an image of good quality is consequently obtained thereon.

It can occur that, in the comparison of a reconverted binary-coded image with the original binary-coded image in the STEP 4, they do not coincide in any of the unit areas prepared therefore. In such cases, by selecting the smallest unit area (A in the example) the comparison will find a way out of the loop in FIG. 2.

Figure 6:
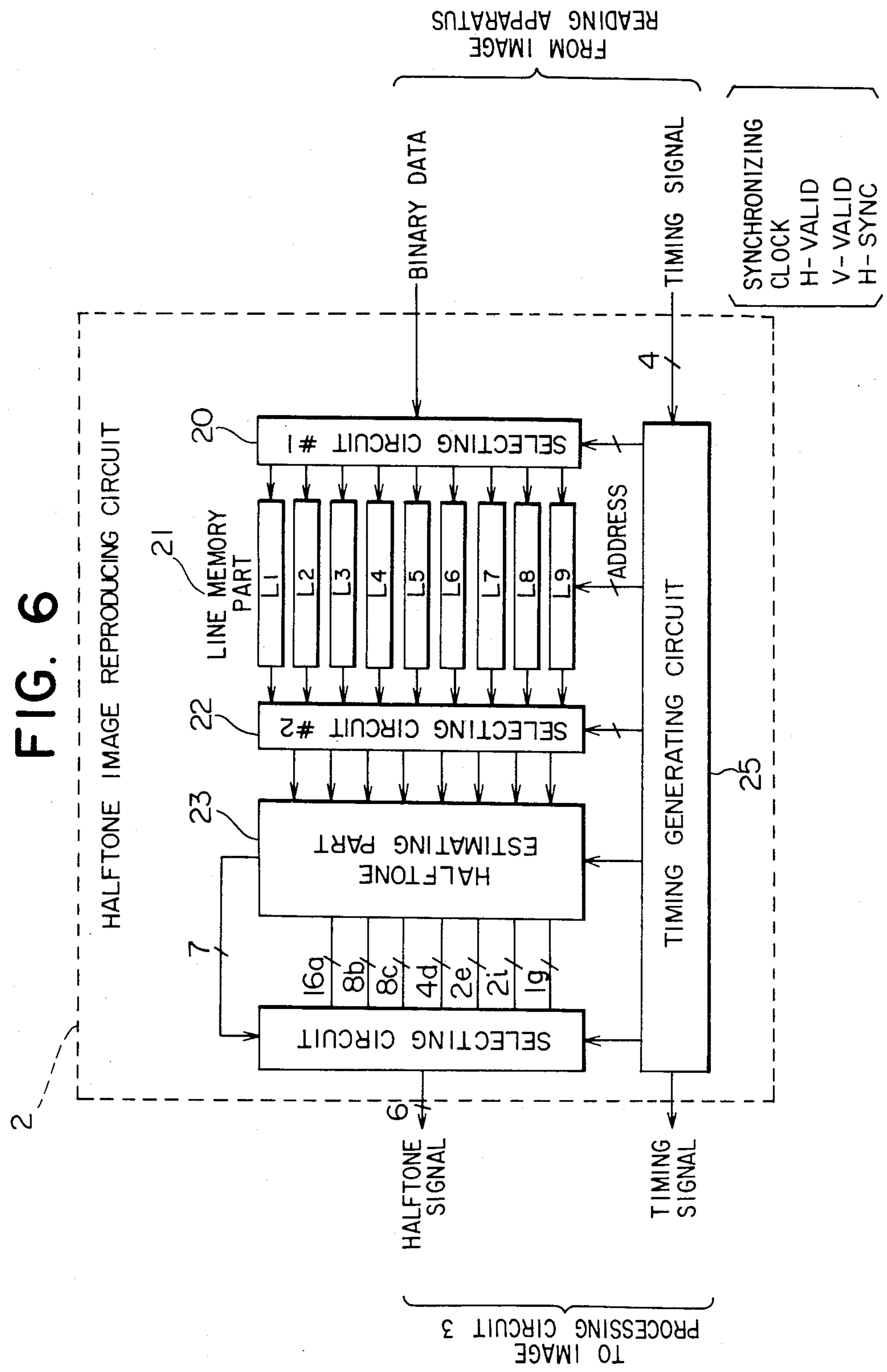
FIG. 6 is an example of the configuration of a halftone image reproducing circuit.

There is now described hereunder a halftone image reproducing circuit 2 applicable in the practice of the present invention particularly with respect to its configuration. FIG. 6 diagrammatically illustrates the configuration of the halftone image reproducing circuit 2, wherein the numeral 20 denotes a first selecting circuit for receiving binary data from an image reading apparatus 1 and for sorting out the flows of data and the numeral 21 denotes a line memory part for separately storing the binary data is each line transmitted from the first selecting circuit 20. The line memory part 21 illustrated in the drawing consists of nine line memories comprising $L_1$ through $L_9$, being designed to store binary data in nine lines simultaneously. A line memory part consisting of nine lines is used in the example herein because the largest unit area G (see FIG. 3) consists of eight lines (8 rows) and because an additional one line is needed for the real time processing. The numeral 22 denotes a second selecting circuit for sorting out the data to be processed which are passed through eight lines out of the nine lines in the line memory part 21. The numeral 23 denotes a halftone estimating part which receives the data outputted from the second selecting circuit 22 and outputs, with respect to each unit area, the estimated values of a halftone image as well as the results of comparing the reconverted binary-coded image with the original binary coded image. The numeral 24 denotes a selecting circuit which receives, for each of the unit areas, the estimated values and the results of comparison between the original binary-coded image and the reconverted binary-coded image outputted by the halftone estimating part 23 and selects the optimal estimated value, and then outputs the selected value as a halftone signal.

Figure 7:
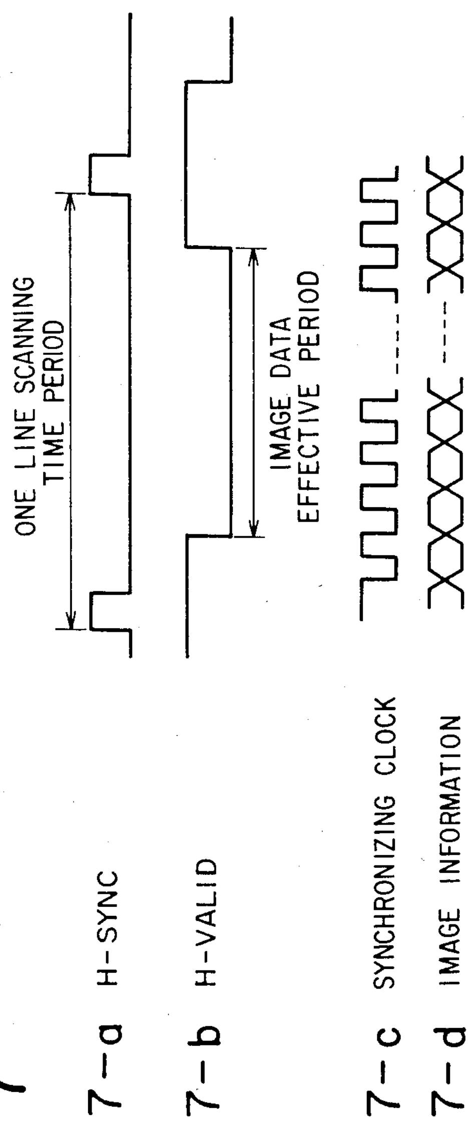
FIGS. 7 and 8 are timing charts of the operation of an apparatus embodying the present invention.
Figure 8:
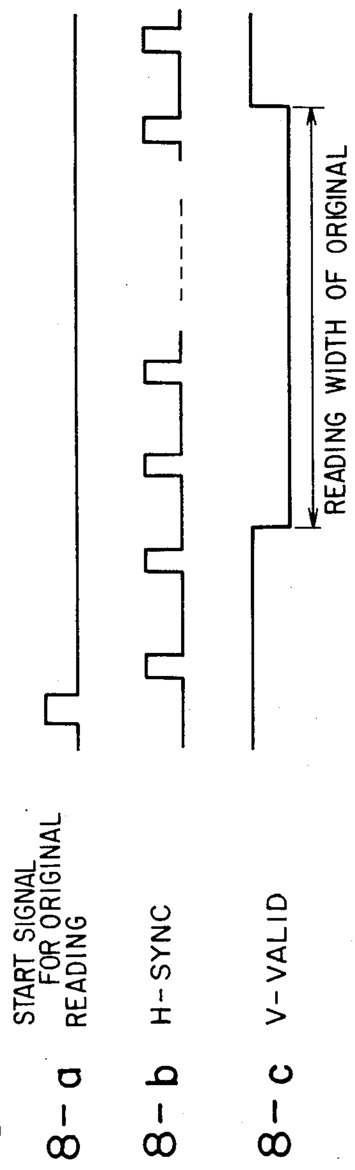

The numeral 25 in FIG. 6 is a timing generating circuit which is supplied with various timing signals (synchronizing clock, H-VALID, V-VALID and H-SYNC) from the image reading apparatus 1 and accordingly transmits relevant timing signals to the first and the second selecting circuits 20 and 22, the line memory part 21 to which the signals addresses the halftone estimating part 23, and the selecting circuit 24. The signal referred to as "synchronizing clock" above means a clock signal (main scanning synchronizing signals) outputted for each unit of the binary data, that referred to as "H-SYNC" means a clock signal (sub-scanning synchronizing signals) outputted for every line, that referred to as "H-VALID" means an enable signal indicating the valid width of the data in the direction of the main scanning, and that referred to as "V-VALID" means an enable signal indicating the valid width of the data in the direction of the sub-scanning (the reading width of the original). The interrelations among these timing signals are shown in timing charts designated as FIG. 7 and FIG. 8. FIG. 7 is a timing chart in the main scanning direction and FIG. 8 is a timing chart in the sub-scanning direction. Hereunder follows the description of the timing charts FIG. 7 and FIG. 8.

In FIG. 7, an H-SYNC signal, an H-VALID signal, a synchronizing clock, and an image information signal are shown, denoted respectively by 7-*a*, 7-*b*, 7-*c*, and 7-*d*. In an H-SYNC signal the interval between the leading edge of one pulse and that of the following pulse constitutes a one line scanning time period (time of CCD light exposure). In a H-VALID signal the interval between the trailing edge of one pulse and the leading edge of the following pulse constitutes an image data effective period. The image information is formed on a bus for every pulse of the synchronizing clock. In FIG. 8 an original reading starting pulse is shown, denoted by 8-*a*, and likewise an H-SYNC signal by 8-*b* and a V-VALID signal by 8-*c*. The interval of a V-VALID signal between the trailing edge and the leading edge constitutes a reading width of the original. The timing generating circuit 25 is thus designed to control the processing operation in accordance with above various timing signals transmitted thereto. The processing operation of these circuits are as follows.

Binary data supplied from an image reading apparatus 1, which are to be stored out into eight separate processing lines, are inputted through a selecting circuit 20 into a line memory part 21 which comprises nine memories $L_1$ through $L_9$; the selecting circuit 20, being supplied with said binary data and timing signals from a timing generating circuit 25, sorts the data out according to the timing signals in a manner in which, for example, the selecting circuit 20 inputs into a line memory $L_2$ until it is full, then inputs into a line memory $L_3$, and repeats inputting said binary data into the other line memories in the same manner in succession. A selecting circuit 22 selects the data in eight memories corresponding to the data of eight rows, which are required for the processing, from the line memory part 21 and transmits them to a halftone estimating part 23.

A halftone estimating part 23 processes the binary data from the eight memories, transmitted from the selecting circuit 22, in a prescribed manner so that it outputs the judging results as well as the estimated values of the halftone image obtained in respect of each of a plurality of differing unit areas and transmits them to a selecting circuit 24. The selecting circuit 24 processes these signals so that it outputs the optimal unit area on the basis of the judging results in respect of the unit areas and the estimated value of the halftone image based on the optimal unit area. The halftone signal outputted by the selecting circuit 24 and the timing signal outputted by the timing generating circuit 25 are transmitted to an image processing circuit 3 (see FIG. 1).

Figure 9:
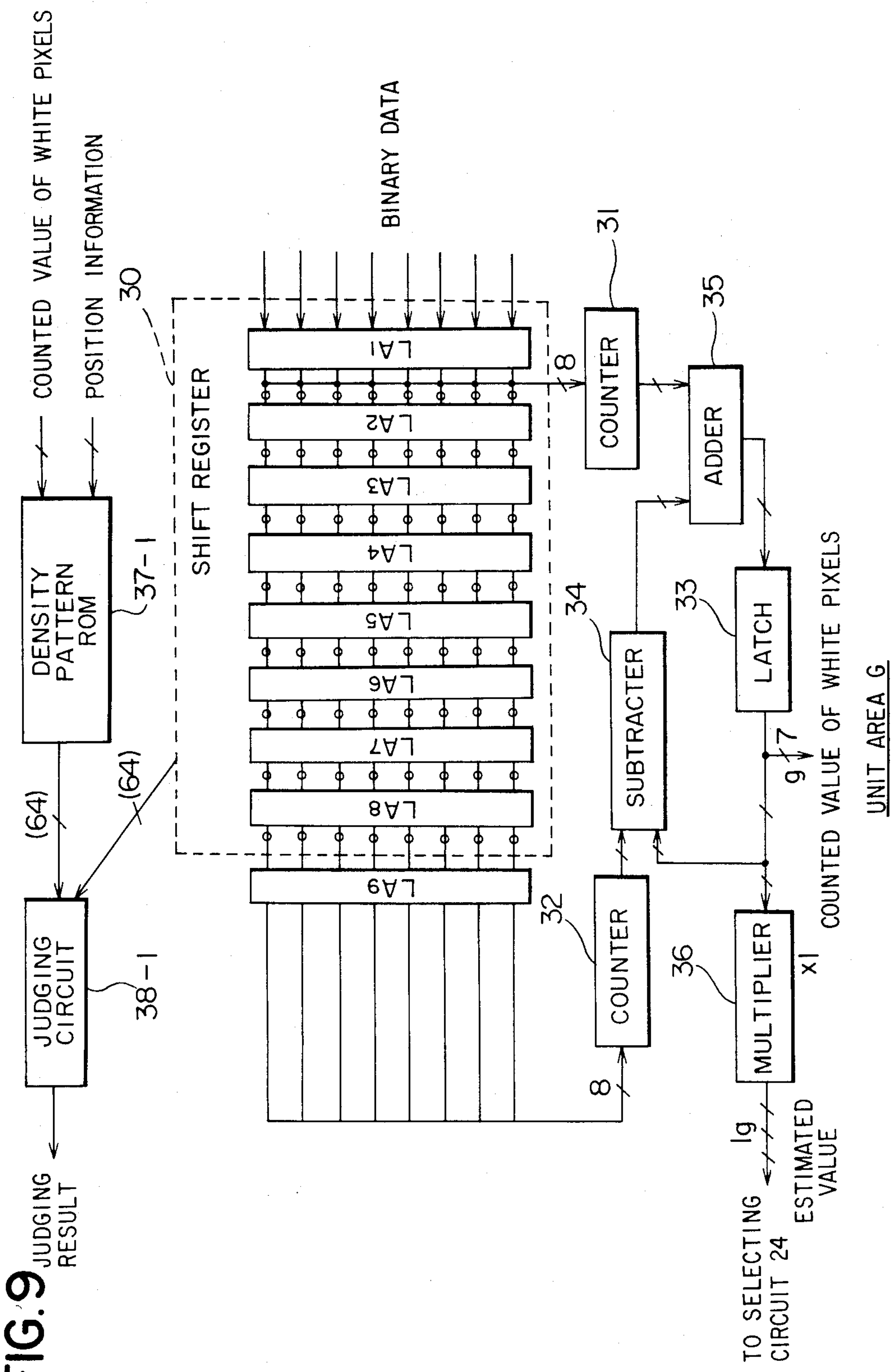
FIGS. 9 through 15 are examples of the configuration of halftone image estimating circuits.
Figure 10:
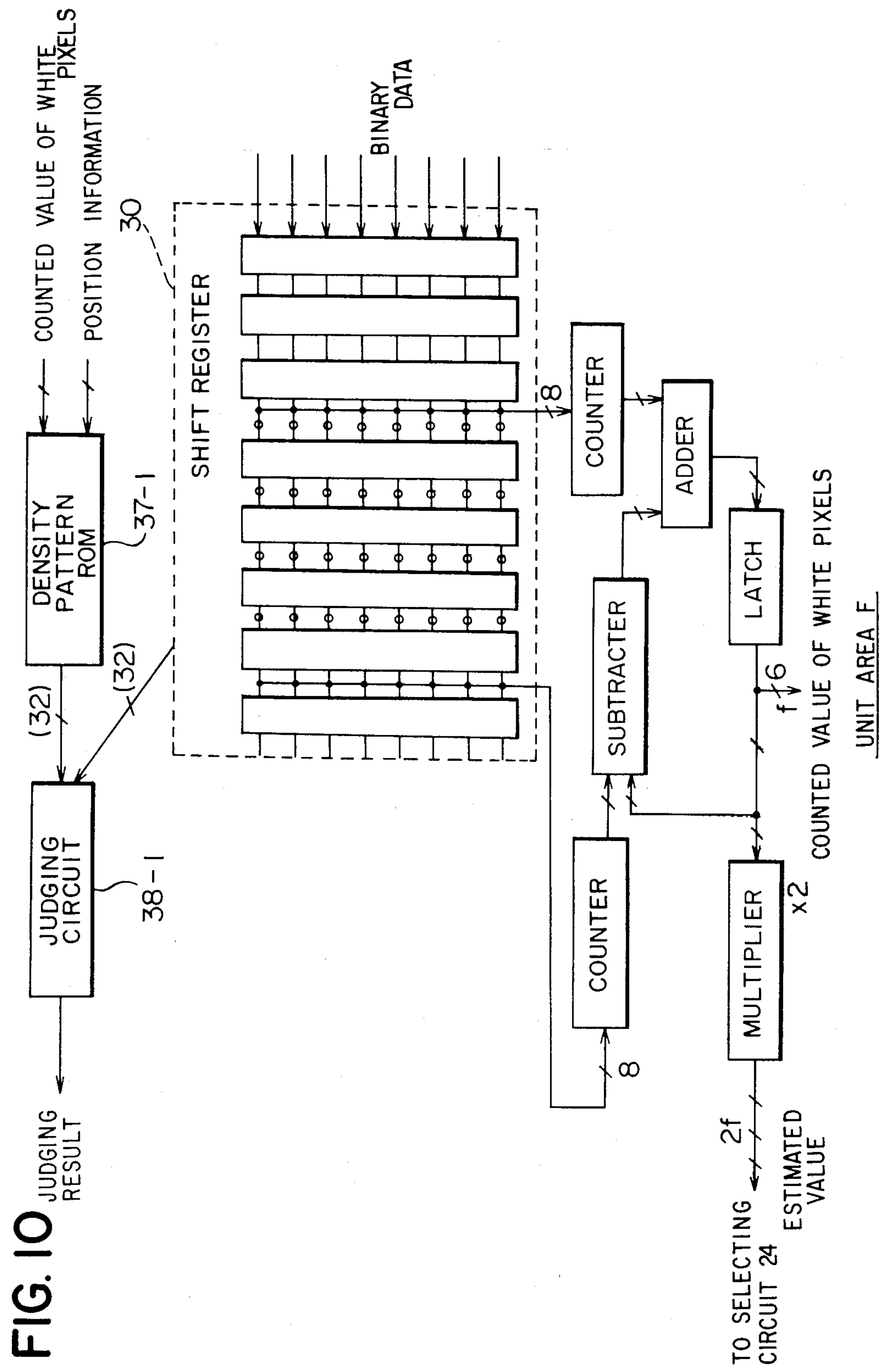
Figure 11:
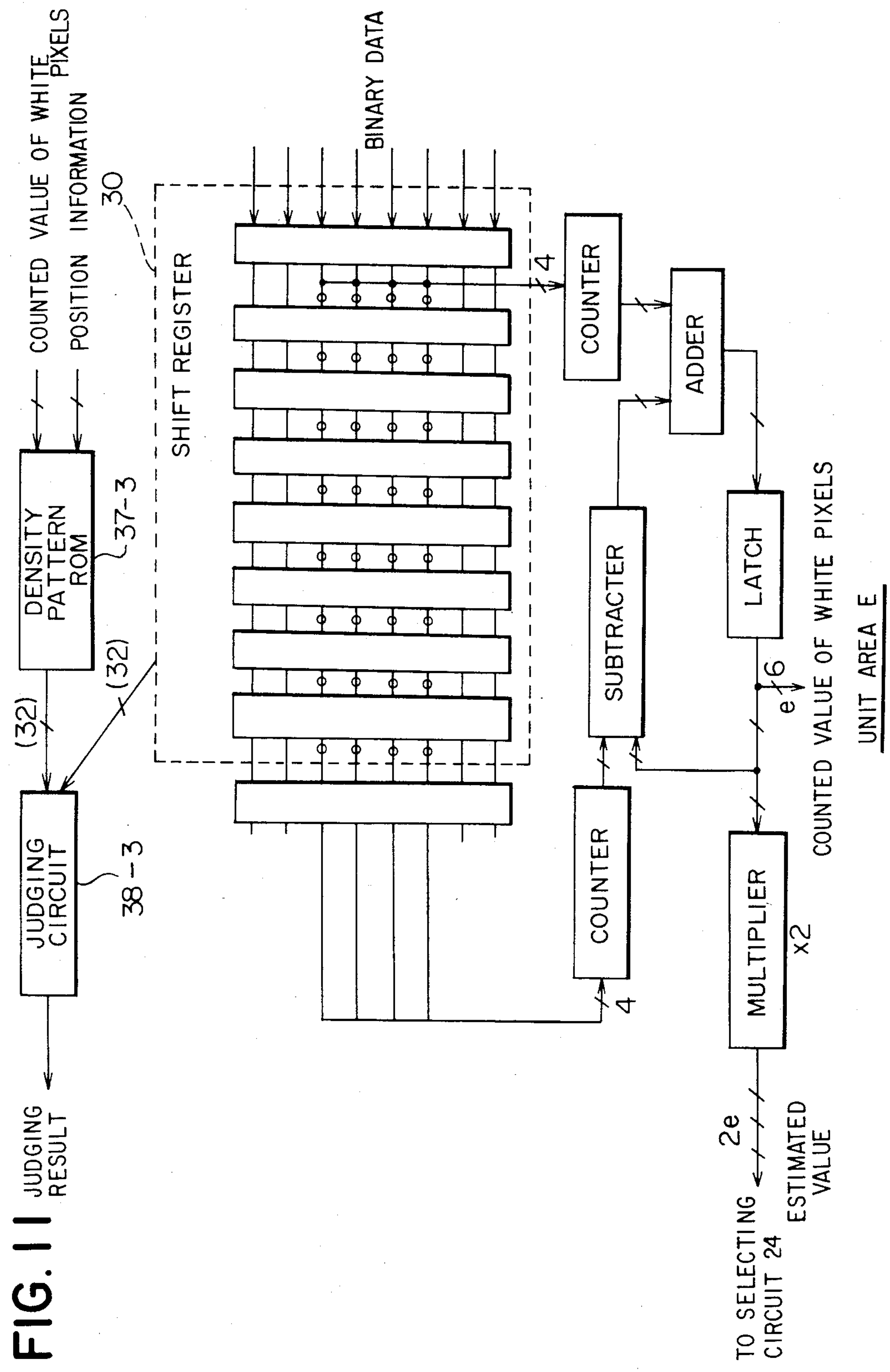
Figure 12:
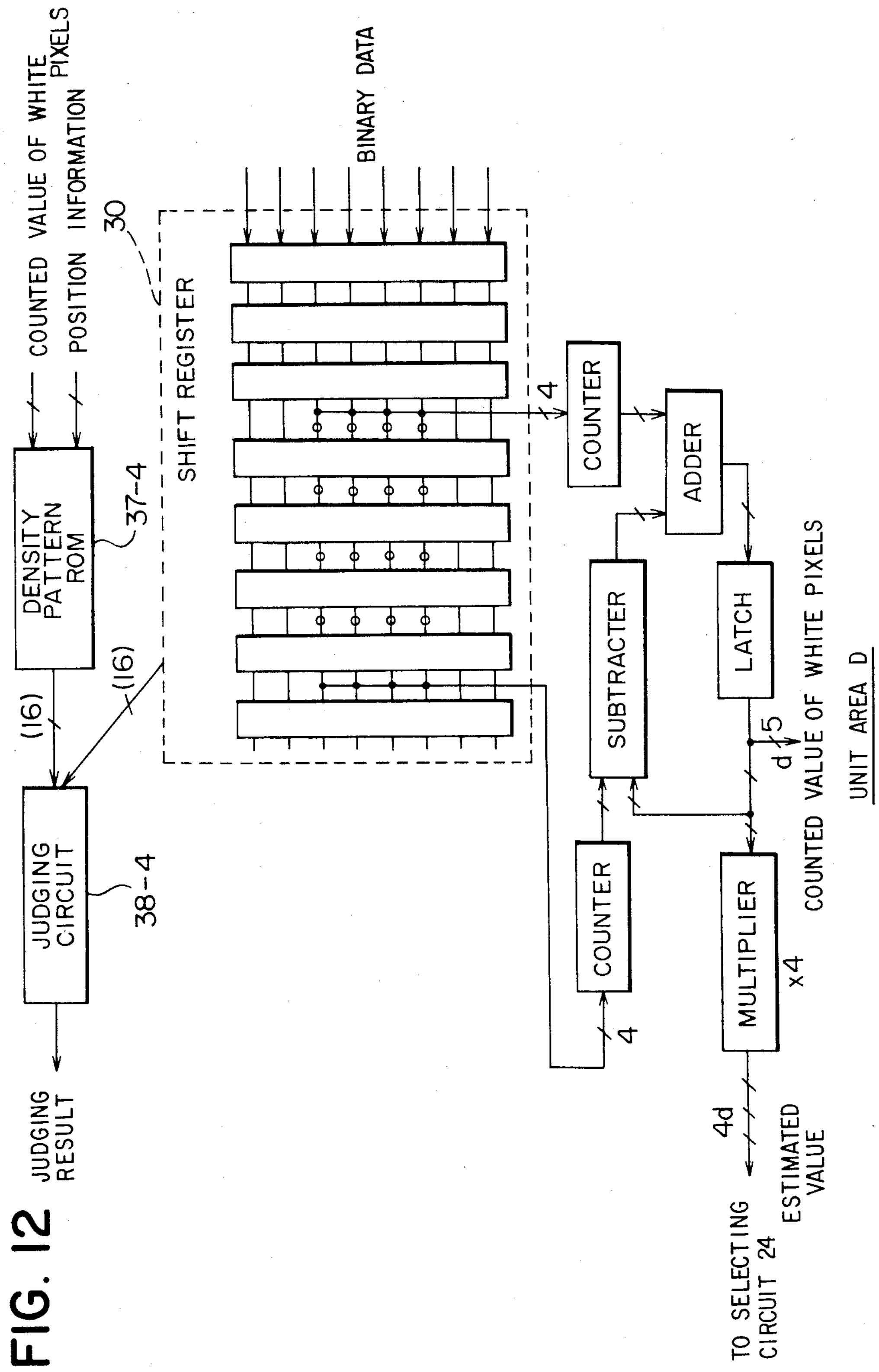
Figure 13:
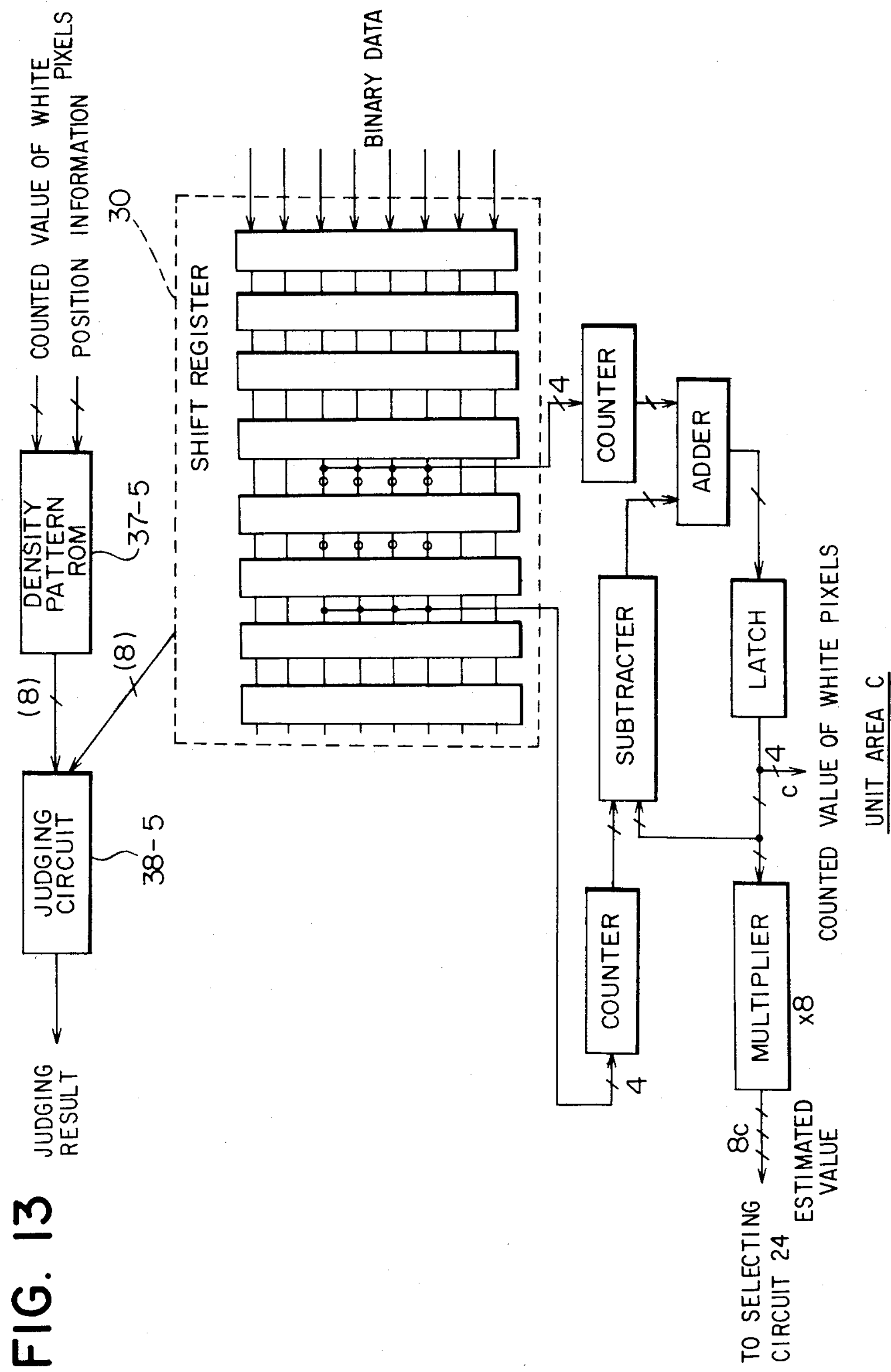
Figure 14:
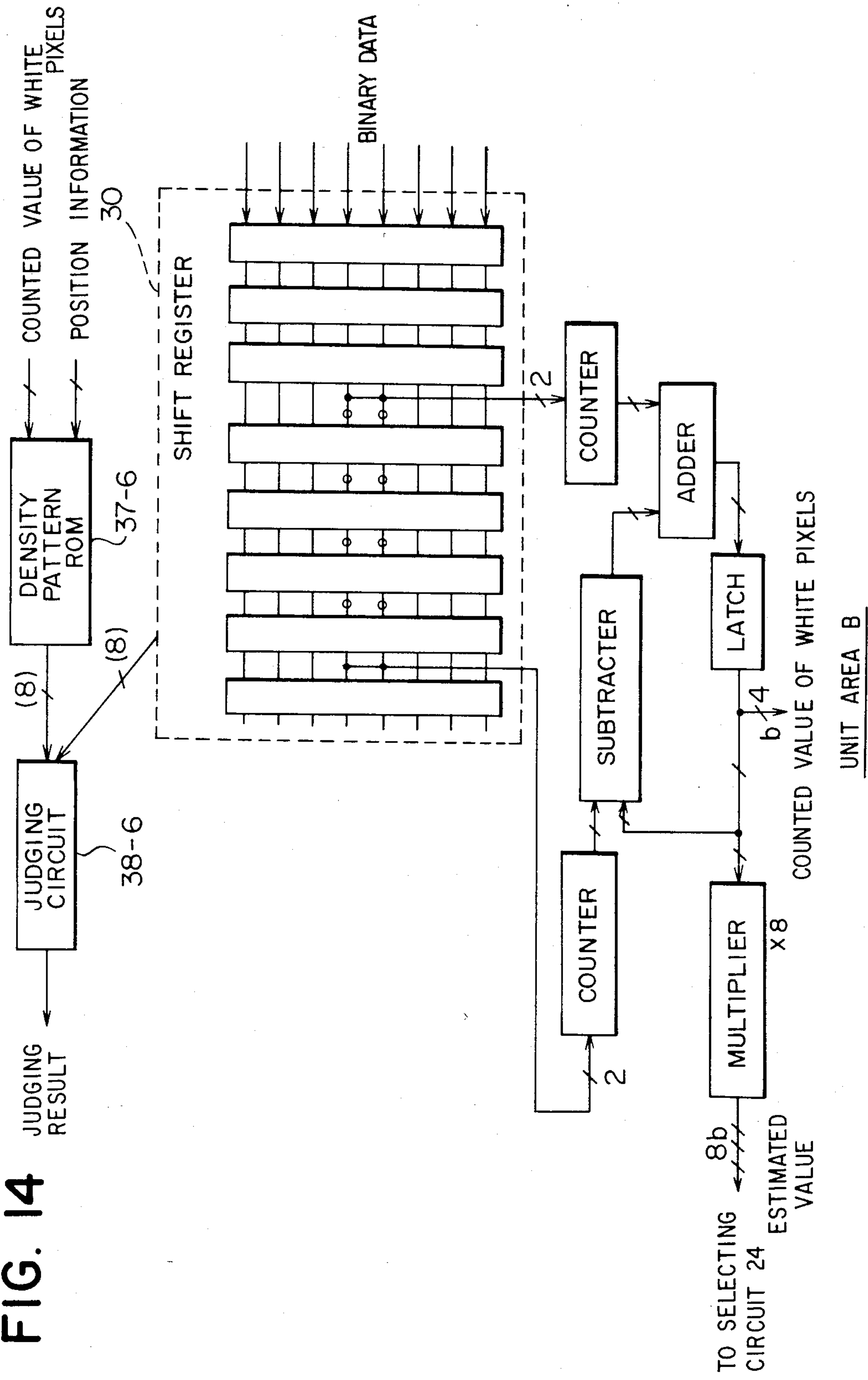
Figure 15:
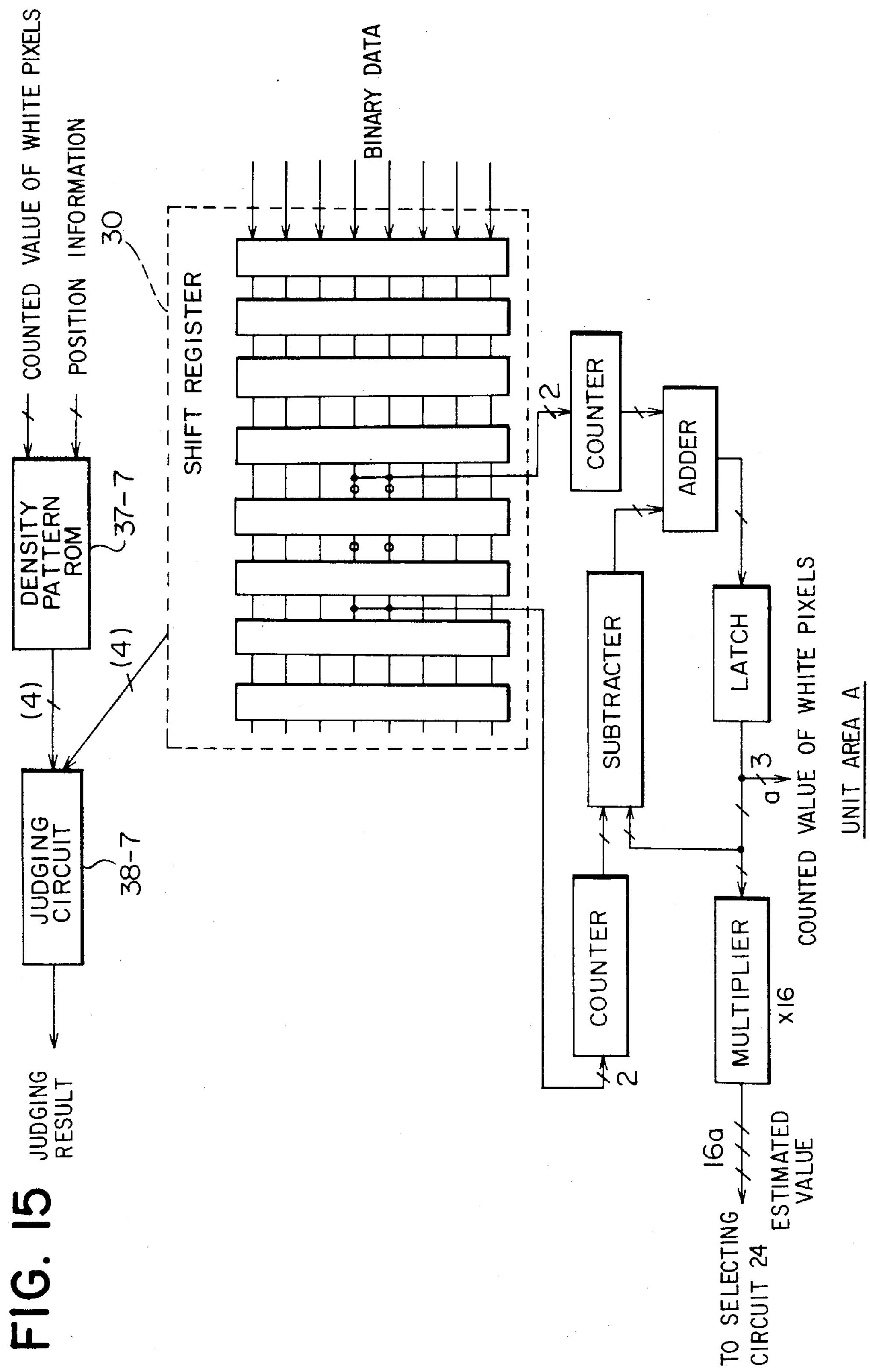

The halftone estimating part 23 consists of halftone image estimating circuits in a number equal to the number of the unit areas used (seven in the example described herein), one of which is shown by FIG. 9. FIG. 9 illustrates the halftone image estimating circuit for the unit area G. The halftone image estimating circuits for the remaining unit areas are shown by FIG. 10 through FIG. 15; the one for the unit area F is shown by FIG. 10, the one for the unit area E by FIG. 11, the one for the unit area D by FIG. 12, the one for the unit area C by FIG. 13, the one for the unit area B by FIG. 14, and the one for the unit area A by FIG. 15. A detailed description is now given hereunder with respect to the halftone image estimating circuit shown by FIG. 9 (the numbers in the illustration designate the respective bit numbers of the signal lines).

Eight bit binary data so selected by the selecting circuit 22, for one example, as to corresponding to the binary data being positioned from (Nth row, Mth column) to ((N×8)th row, Mth column) in FIG. 1-*e* are shifted from the right to the left in the shift register 30 comprising latches $LA_1$ through $LA_8$, as illustrated, in accordance with timing signals from the timing generating circuit 25. The shift register 30 comprising latches $LA_1$ through $LA_8$ is used in common for the halftone image estimating circuits shown by FIGS. 10 through 15. In each illustration of the shift registers 30, each small circle mark (°) on data lines denotes one unit of image data (binary date). Where data from the unit area G, having an array of eight rows×eight columns (8×8), are processed, it may seem reasonable to sum up the white pixels at every shifting in the shift register 30, but such a method not only takes time but also makes the circuit complicated. In the example described herein a simplified method is employed in counting the white pixels in view of the fact that the binary data are shifted from the right to the left and that the data change in the last one line (the contents of the latch $L_8$ in the example) only.

Stated more illustratively, shifting of data by one line brings new binary data to be latched in the latch $LA_1$. The white pixels in this one line are counted by a counter 31. The one line of data that are placed outside the shift register 30 by the shifting are latched in the latch $LA_9$ placed outside. The white pixels in this one line thus latched are counted by a counter 32. Since the number of the white pixels in the unit area G before the shifting is latched in the latch 33, the number g of the white pixels within the unit area G after the shifting can be obtained by subtracting the number of the white pixels in said one line placed outside from said number of the white pixels in the latch 33 by means of a subtracter 34 and by compensating for the decrease of the white pixels with the white pixels in the one newly entered line by means of an adder 35. The number g of the white pixels thus obtained is in turn latched in the latch 33. The output of the latch 33 is multiplied by a gain (the gain is one in this instance) by means of a multiplier 36 and transmitted as a halftone image estimated value to the selecting circuit 24.

The halftone image estimating circuits for the other unit areas, illustrated by FIGS. 10 through 15, also operate in the same manner as the above-mentioned circuit for the unit area G. The data are drawn from the shift registers 30 at different positions, depending on the different unit areas, for the subsequent counting of the white pixels for the halftone image estimated values to be outputted. For example, for the unit area F of which area size is (8×4), the shift register 30 is set relevant to the array of eight rows×four columns (8×4), as shown in FIG. 10. The shift registers 30 are likewise adapted for the other unit areas. Instead of using the multiplier at the end of each of these circuits, the same purpose is achieved by a shift register by shifting by the number of the gain to the left.

Figures 16, 17:
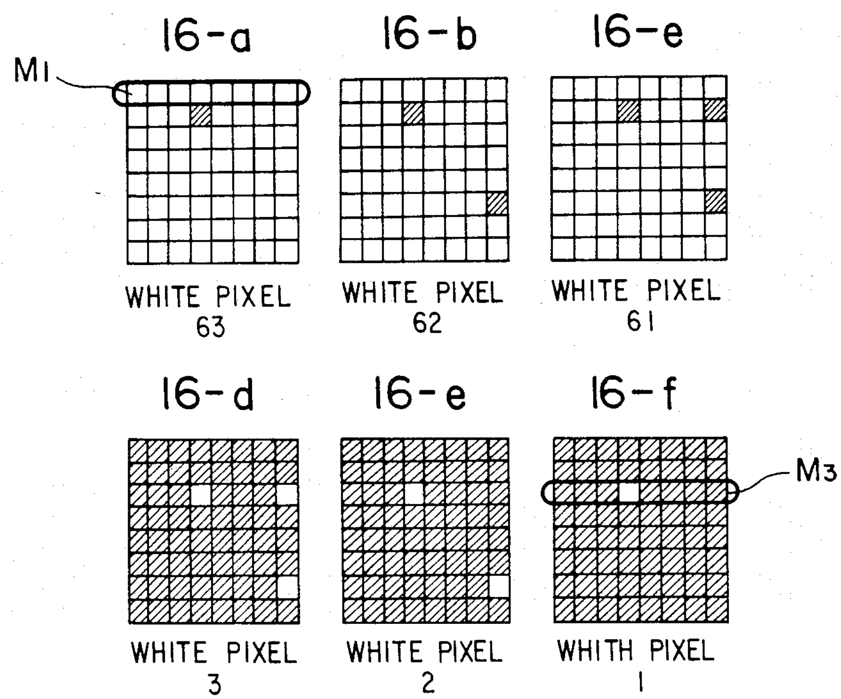
FIG. 16 shows density patterns.
FIG. 17-*a* is an explanatory drawing showing an example of the movement of the unit area on the threshold value data showed in FIG. 1-*d*, FIG. 17-*b* is an explanatory drawing showing an example of the change of the threshold value data in accordance with the movement of the unit area, FIG. 17-*c* is an explanatory drawing showing an example of the change of the density pattern of the coded data in accordance with the change of the threshold value data, FIG. 17-*d* shows addresses and relevant data in the density pattern ROM.

Referring to FIG. 9, there is now explained the operation of circuits for comparing patterns between original binary-coded images and reconverted binary-coded images. If a pattern, for example, shown by 5-*c* in FIG. 5 is given as a threshold value pattern for reconversion, reconversion of the counted values (the number) of the white pixels within unit areas, as average pixel levels, by using the threshold value pattern 5-*c* in FIG. 5, produces density patterns of the reconverted binary-coded image shown by FIG. 16. Different density patterns are shown in FIG. 16, with 63 white pixels by 16-*a*, with 62 white pixels by 16-*b*, with 61 white pixels by 16-*c*, with 3 white pixels by 16-*d*, with 2 white pixels by 16-*e*, and with one white pixel by 16-*f*. Although only six kinds of density patterns are shown in FIG. 16, there are in fact sixty-four kinds of density patterns prepared in relation to the threshold value pattern shown by 5-*c* in FIG. 5 and stored in a density pattern ROM 37. In this example the density pattern ROM 37 is, as shown by 16-*a* in FIG. 16, composed of eight ROMs, one ROM consisting of 8 bits for every row and eight ROMs for eight rows, so as to be able to output patterns with sixty-four bits (shown in parentheses on signal lines in FIG. 9) at once. In the drawing 16-*a* in FIG. 16 $M_1$ represents one ROM. The density pattern ROM 37 receives the numbers of white pixels g as the left side signal of an addresses and the position information relating to the relocation of the unit area as the right side signal of the addresses so that the density patterns (corresponding to the reconverted binary-coded images, such as shown in FIG. 5-*d*, for example) are outputted according to the addresses.

The density patterns corresponding to the movement of the unit areas is now described. Namely, the threshold value data used for binary coding the original halftone image showed in FIG. 1-*b* is indicated as shown in FIG. 1-*d*. The moving center of the unit areas move by one pixel on the relevant binary coded data showed in FIG. 1-*e* for obtaining the estimated halftone image in this example. In the event of corresponding the movement of the unit areas to the threshold value data, the movement of the unit areas is indicated as arrow mark in FIG. 17-*a*. Accordingly, for example, if the moving center of the unit areas successively move by one column, the threshold value data within the unit areas may change as indicated in FIG. 17-*b*.

As the threshold value data within the unit areas change in accordance with the movement of the unit areas, the density pattern of the reconverted binary image data also change accordingly, because the density pattern is obtained by the step of counting the number of white pixel within the unit areas, setting the counted value as the average pixel density level within the unit areas and coding the average pixel density by using the threshold value data corresponding to the unit areas.

For example, in ROM $M_3$ which is 3rd row of ROM having only one white pixel showed in FIG. 16-*f*, the density pattern of ROM $M_3$ changes as shown in FIG. 17-*c* in accordance with the change of threshold value data accompanying with the movement of the unit areas showed in FIG. 17-*b*.

Now, assuming that the data of the ROM are shown with a white pixel represented by "1" and a black pixel by "0", for example, with reference to FIG. 17-*c*, the left side 4 bits and the right side 4 bits of the ROM $M_3$ change with relocation of the unit area as follows: 10→20→40→80→01→02→04→08 (hexadecimal).

FIG. 17-*d* shows one example of the relationship between the address of the density pattern ROM 37 and density pattern data. That is, FIG. 17-*d* indicates a change of the density pattern of ROM $M_3$ which positions at 3rd row of ROM having one white pixel showed in FIG. 16-*f*. By preparing density pattern data for every ROM per every values of white pixel, the density pattern data may be outputted in responsive to the address signals consisting of the numbers of white pixels and position information relating to the movement of the unit areas.

In the event of determining the density pattern shown in FIG. 16 as an initial position corresponding to the initial position of unit area, 10 (hexadecimal) may be set as the initial position for the case of the numbers of white pixels being 1.

A density pattern (reconverted binary-coded image) outputted by the density pattern ROM 37 is compared with the binary-coded image outputted by the shift register 30 in the judging circuit 38 to see whether these patterns are identical or different. THe judging circuit 38 outputs a "1" level when they are identical and a "0" level when they are different.

The operation is the same for the comparison of patterns with the other unit areas as the above-described comparison with the unit area G, the difference only being the number of dots used in the comparison.

Namely, the density pattern corresponding to the number of dots within the other unit areas, of which the moving center corresponds to the moving center of unit area G as shown in FIG. 3, and the change of the density pattern of the other unit areas in accordance with the movement thereof may be outputted as described above.

The halftone image estimated values relative to respective unit areas and the judging results of the unit areas, outputted by the halftone estimating part in the manner mentioned above, are transmitted to the selecting circuit 24, which then selects the optimal unit area and outputs its estimated value of the halftone image.

A halftone image reproduced in a circuit where a threshold value matrix is used comes out lacking quality and fidelity unless the position of the binary-coded image coincides with that of the threshold value matrix. In order to exclude such defective reproduction the practice of the present invention is so designed that, where the position of a density pattern and a multicoded image are provided from the image reading apparatus 1, the threshold value address for obtaining threshold value data for binary coding of the image is obtained from said image reading apparatus 1 and given as a position information signal to the density pattern ROM shown in FIGS. 9 through 15.

FIG. 18 shows the flows of the signals between an image reading apparatus 1 and a halftone estimating part 23. The same numerals are used to denote identical objects appearing in common in FIGS. 1, 6 and 9. The numeral 41 denotes a threshold value pattern ROM wherein threshold value data for binary coding are stored. The numeral 42 denotes a binary coding circuit which compares image data in the form of digital data obtainable through conversion after reading by CCD or the like with threshold value data outputted by a threshold value pattern ROM 41 and outputs the resultant binary data (binary signals). The numeral 43 denotes a main scanning counter for counting a synchronizing clock. The numeral 44 denotes a sub-scanning counter for counting an H-SYNC clock. The outputs of the last-mentioned two counters 43 and 44 are designated as addresses to the threshold value pattern ROM 41.

The threshold value pattern ROM 41 outputs threshold value data according to the scanning and transmits them to the binary coding circuit 42. The threshold value data are preset, for example, as shown by 5-*c* in FIG. 5. The binary coding circuit 42 successively converts the image data, being inputted in synchronising with the threshold value data, into binary signals which are transmited to the halftone estimating part 23, and, simultaneously in parallel therewith, the main scanning counter 43 and the sub-scanning counter 44 respectively output address signals for threshold values which are provided to a position information counter 39 within the halftone estimating part 23. The position information counter 39 is also provided with a start signal for reproducing operation, a synchronizing clock, and an H-SYNC clock.

With circuits constructed as above a start signal for reproducing operation activates the main scanning counter 43 and the subscanning counter 44 to output the address signals (6 bits in total) corresponding to the binary signals to be firstly processed to reproduce halftone image, the address signals are, provided as addresses to the threshold value pattern ROM 41 and simultaneously set in the position information counter 39. When the binary signal stems from the image reading apparatus at this time, the start signal for reproducing operation is formed on the basis of the start signal for original reading shown by 8-*a* in FIG. 8. In the event of reproducing the halftone image from the position as indicated in FIG. 3, for example, in which the moving center of the unit areas are located at the relevent position, the position information corresponding to this position is outputted from the main scanning counter 43 and the subscanning counter 44 in order to address to the threshold pattern value ROM 41. Next, the position information counter 39 counts a synchronizing clock and an H-SYNC clock on the basis of the preset values corresponding to the initial position of the moving center and provides a position information signal (a part of the addresses) to the density pattern ROM 37 in which the position information signal also corresponds to the initial position of the moving center. This position information is the same as that provided to the threshold value pattern ROM 37 in FIG. 9. Since, according to this invention, the address provided to the threshold value pattern ROM 41 can be set as the initial value of the position information provided to the density pattern ROM 37, it is always possible to make the position of a binary-coded image obtained from the original image coincide with that of the output pattern (reconverted binary-coded image) of the density pattern ROM.

For the purpose of each explanation, the main scanning counter 43, the subscanning counter 44, and the position information counter 39 are respectively indicated, but these counter are so constitued as to be a position information control means.

The process is as follows when the binary signal provided to the halftone image reproducing circuit 2 stems from the image memory unit 6.

When a binary signal stemming from the image reading apparatus 1 is stored in the image memory unit 6, an address signal for a threshold value, as shown in FIG. 18, is stored as a header signal for distinguishing purposes at a specific location. For the reproducing operation the header is first read and set as the initial value in the position information counter 39. The introduction of an address signal for a threshold value in starting the reproducing operation now makes the operation free from errors and ensures good quality of the image obtainable.

Figure 19:
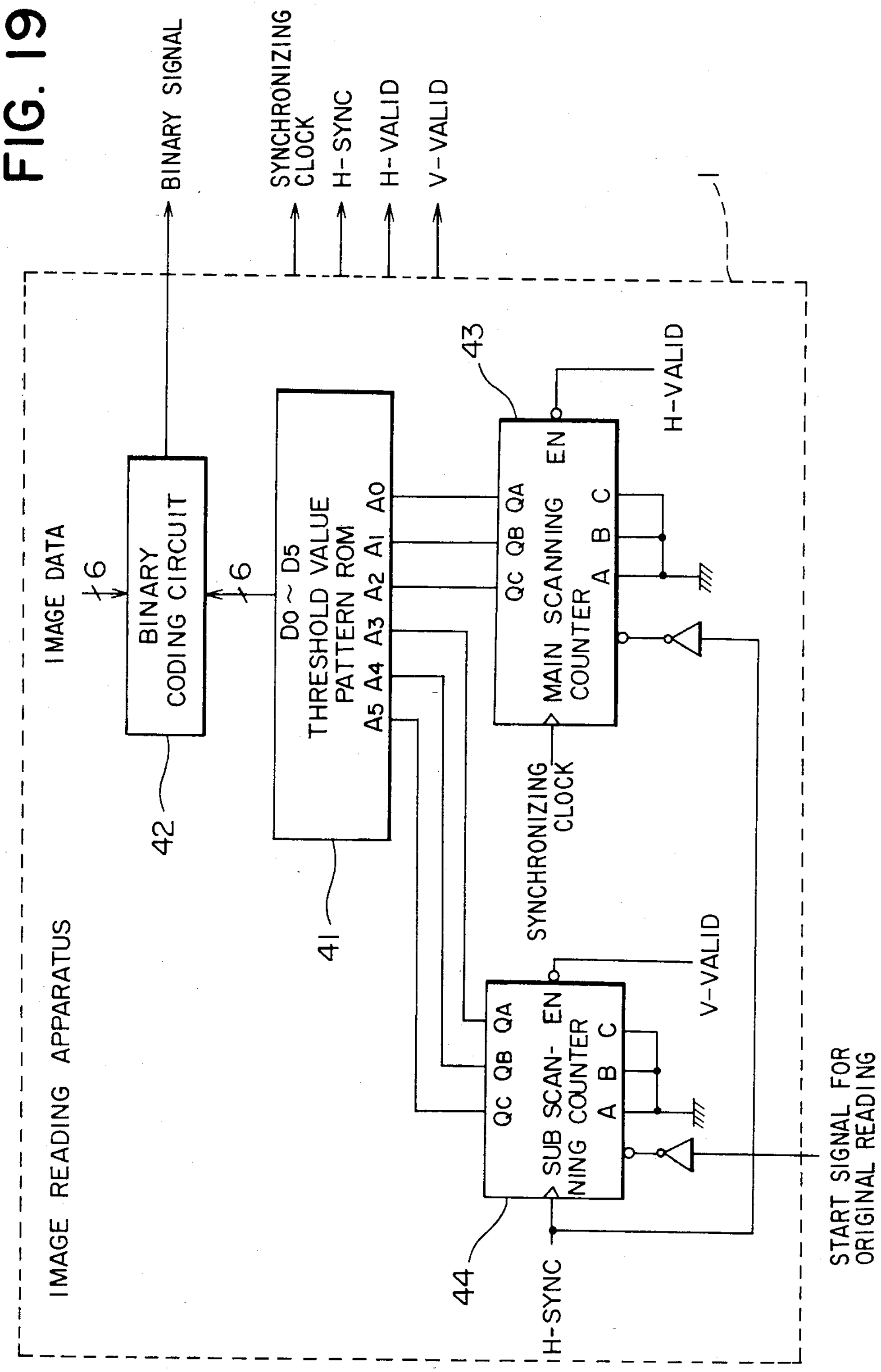
FIG. 19 shows an example of the configuration of an image reading apparatus.
Figure 21:
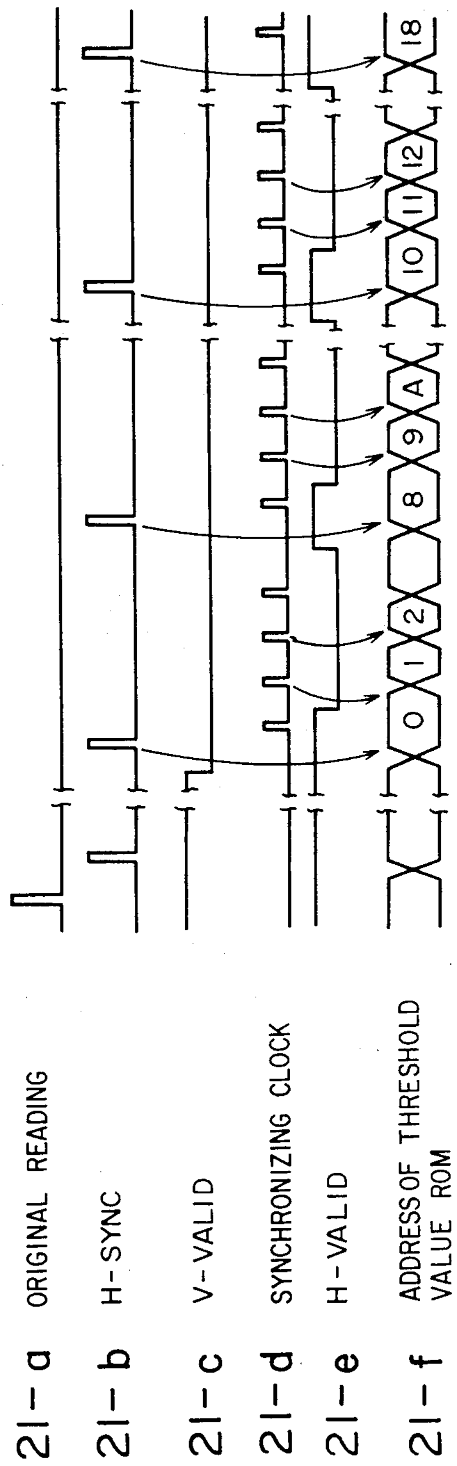
FIG. 21 diagrammatically explains the timing of the original reading.
Figure 22:
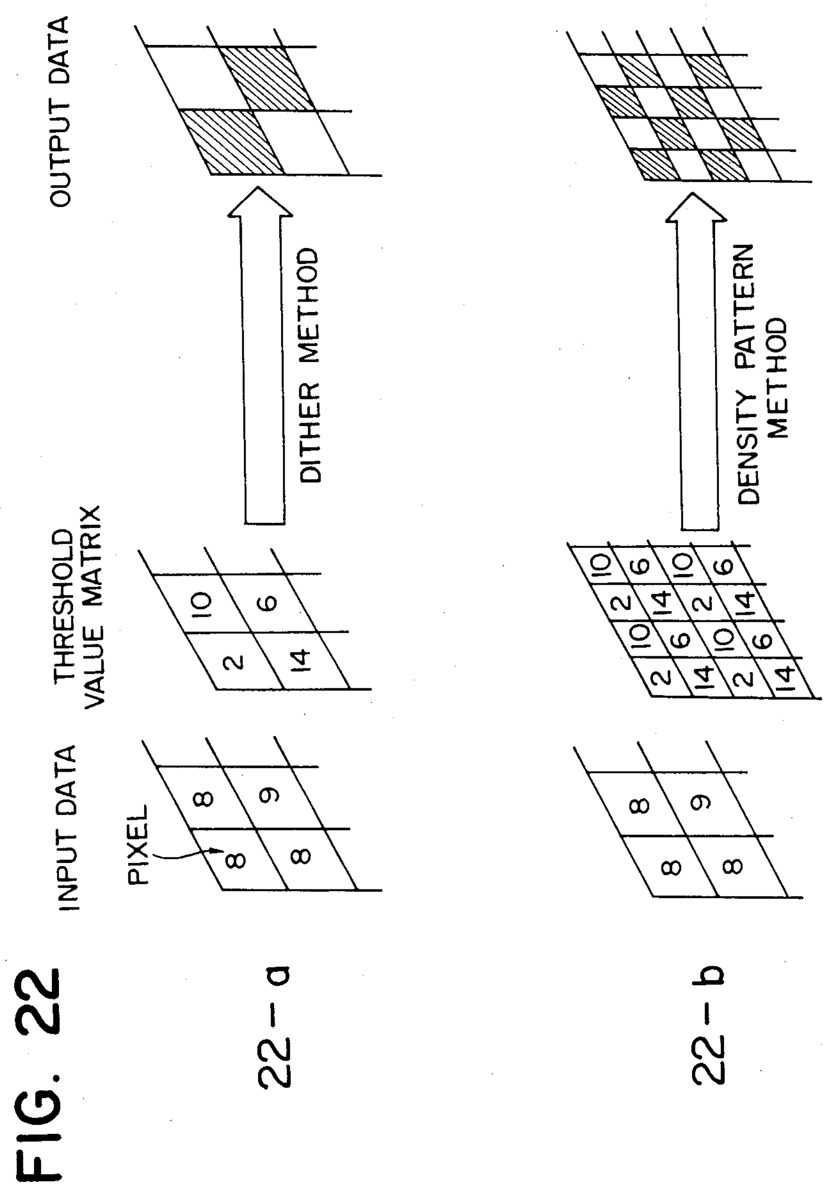
FIG. 22 shows conventional binary coding methods.

Referring now to FIG. 19, there is described hereunder the process that takes place when the binary data for an image to be reproduced are supplied from the image reading apparatus 1. The main scanning counter 43 counts a synchronizing clock, which is a synchronizing signal in the direction of the main scanning, while the sub-scanning counter 44 counts a H-SYNC signal, so that a relevant address signal is provided to the threshold value pattern ROM 41. The threshold value pattern ROM 41 outputs data for comparing the size with the image data in the binary coding circuit 42 and then outputs a binary signal. FIG. 20 shows the contents of the threshold value pattern ROM 41. In this example the initial address is given 0. FIG. 21 shows timing signals for reading the original, a start signal for original reading being denoted by 21-*a*, an H-SYNC pulse by 21-*b*, a V-VALID signal by 21-*c*, a synchronizing clock by 21-*d*, an H-VALID signal by 21-*e*, and an address of threshold value ROM by 21-*f*. When a start signal for original reading is given, the values of A, B and C are set as initial values, 0 as the initial value in the example, in the sub-scanning counter 44. The sub-scanning counter 44 has EN terminals connected to the V-VALID so that it counts an H-SYNC signal when an "0" level is given (at the time of reading the original). In the main scanning counter 43, when an H-SYNC signal is given, the values of A, B and C are set as initial values, 0 as the initial value in the example herein. The EN terminals of the main scanning counter 43 counts the synchronizing clock only during the effective period of the image data on the basis of the H-VALID signal. As is clear from FIG. 21, the addresses of threshold value ROM start with 0 (initial value). The halftone estimating part 23 is so designed that the reproducing operation starts in response to a start signal for original reading so that the position of a threshold value matrix coincides perfectly with that of a density pattern.

Reverting to FIG. 1 for reference, a halftone signal outputted by the halftone image reproducing circuit 2 is provided to the image processing circuit 3, where it performs the image processing in accordance with a relevant processing mode inputted beforehand. For example, if a processing mode is set for enlargement or reduction, enlargement or reduction of the image is carried out accordingly, and, if a processing mode is set for filtering, filtering of the image is carried out. After the image processing in the image processing circuit 3, the halftone signal is reconverted to binary data in the binary coding circuit 4. The binary data thus obtained can be reproduced as an image in the recording apparatus 5 or stored in the image memory unit 6. The binary data thus stored in the image memory unit 6 when required can be read and reproduced an image in the recording apparatus 5 or can be returned to the halftone image reproducing circuit 2 and made to form the halftone image again.

As will have become clear from the foregoing description, the present invention enables estimating the halftone image from a binary-coded image in the practice so that the processing of images, such as enlargement, reduction and filtering, can be carried out at a halftone level, hence good quality of images. Furthermore, an image can be stored in the form of binary data in a memory when the image is processed, and, therefore, the present invention contributes to economizing on memories.

Although the foregoing description of the present invention refers to cases where the white pixels within unit areas are counted, the applicability is not restricted to such cases but extends to all other cases where the estimation of a halftone image is based on the ratio between the white and the black regions within a unit area. Whereas each pixel is scanned to from a halftone image in the description, the invention permits scanning two or more pixels as a scanning unit. Whereas seven different unit areas are used in the description, the invention permits using a different number of unit areas and those differing in size from the unit areas specified in the description. The reproduction of images can be based on multicoded images such as ternary-coded images and quanternary-coded images, besides binary-coded images referred to in the description.

The present invention formulates, for reproduction of an image, a method wherein a plurality of differing unit areas are used for every pixel and the estimated values of the halftone image are obtained in the order beginning with the largest unit area so that by selecting from among these estimated values the one which meets a prescribed judging condition a halftone image estimated value relevant to each pixel is determined, and by introducing a thus formulated image reproducing method the invention provides an image processing apparatus which reproduces images with a high degree of reproducibility.

What is claimed is:

1. An image processing apparatus for reproducing a halftone image comprising:

a converting means for obtaining an original multicoded image data by converting a original halftone image data by using a predetermined threshold value matrix, the original multicoded image data having of different density regions;

a plural kinds of unit areas capable of shifting per a pixel on the original multicoded image data; and a processing means including means for obtaining a value based on a ratio between density regions of the original multicoded image data within the unit area being located thereon, reconverting the value into a remulticoded image data by reconverting the value by using said threshold value matrix, comparing density pattern between the remulticoded image data and the original multicoded image data within the unit area, in which the value, the remulticoded image data and the comparison result can be obtained per each unit area respectively, and selecting the optimum value in a predetermined manner from the comparison results of the plural unit areas in order to reproduce the halftone image data based on the optimum value, wherein said image processing apparatus further comprises a position information control means for conforming the threshold value arrangement of the threshold value matrix used for obtaining the remulticoded image data corresponding to the unit area with the threshold value arrangement of the threshold value matrix used for obtaining the original multicoded image within the unit area.

2. The image processing apparatus of claim 1, wherein said position information control means comprises a scanning counter for generating a position information signal corresponding to a relation between the original muticoded image data and the threshold value data used therefor during converting the original halftone image and controls the threshold value arrangement to be used for obtaining the remulticoded image data in accordance with the position information signal in order to conform with the threshold arrangement used for obtaining the original multicoded image data.

3. The image processing apparatus of claim 2, wherein said processing means comprises a density pattern memory for storing in advance the remulticoded image data corresponding to the value and the threshold value arrangement of the threshold value matrix and said density pattern memory can be addressed by both the position information signal and a value signal corresponding to the value, whereby said density pattern memory can output density pattern of the remulticoded image data corresponding to the conformed threshold value arrangement upon being addressed by the value signal and the position information.

4. The image processing apparatus of claim 3, wherein said plural unit areas have moving centers and said moving centers are located at same position in predetermined manner and then said plural unit area shift simultaneously.

5. The image processing apparatus of claim 4, wherein a maximum unit area in area size of (row×column) of said plural unit area have same size with that of the threshold value matrix used for obtaining the original multicoded image data.

6. The image processing apparatus of claim 5, wherein said density pattern memory has a same size of (row×column) with that of said maximum unit area.

7. The image processing apparatus of claim 6, wherein said position information control means so controls said density pattern memory as to output the density pattern of remulticoded data corresponding to both the respective area size and the respective value of said plural unit areas.

8. The image processing apparatus of claim 7, wherein said position information control means so controls said density pattern memory as to change the density pattern of remulticoded data to be outputted in coincident with the change of the threshold value arrangement used for obtaining the original multicoded image data according to the change of the multicoded image data within the unit area in accordance with the movement of the unit area.

9. An image processing apparatus comprising;

halftone image estimation means for obtaining an estimation value based on a ratio between white regions and black regions per a plurality of unit areas, in which the plural unit areas are set on a binary image having white regions and black regions per a pixel of halftone image to be estimated, reconverting means for converting the estimation value into a binary image by using a dither matrix corresponding to the size of the unit area, and selection means for comparing the binary image within the unit area with the reconverted binary image and determining the estimation value of the unit area, in which the both binary images are coincident with each other, as the halftone image.

10. A method of estimating a halftone image comprising the step of:

setting a plural kinds of unit areas per a pixel of a halftone image to be estimated on a binary image having white regions and black regions, obtaining a estimation value based on a ratio between white regions and black regions of the binary image within the unit areas, comparing the binary image within the unit area with a reconverted binary image obtained by converting the estimation value by using a dither matrix corresponding to the unit area, and determining the estimation value of the unit area, in which both binary images are coincident with each other, as the halftone image.

11. The method of claim 10, wherein said step of obtaining the estimation value per the unit area respectively are carried out simultaneouly by parallel operation.

12. The method of claim 11, wherein said step of obtaining the estimation value per the unit area respectively are carried out by pipe line operation.

* * * * *